US011644568B2

(12) United States Patent
Lee et al.

(10) Patent No.: US 11,644,568 B2
(45) Date of Patent: May 9, 2023

(54) METHOD AND APPARATUS FOR DETECTING THAT A DEVICE IS IMMERSED IN A LIQUID

(71) Applicant: Samsung Electronics Co., Ltd., Gyeonggi-do (KR)

(72) Inventors: Yong-Suk Lee, Seoul (KR); Tae-Ho Kang, Gyeonggi-do (KR); Sung-Woo Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1338 days.

(21) Appl. No.: 16/031,107

(22) Filed: Jul. 10, 2018

(65) Prior Publication Data

US 2018/0329055 A1 Nov. 15, 2018

Related U.S. Application Data

(63) Continuation of application No. 14/948,825, filed on Nov. 23, 2015, now Pat. No. 10,088,565.

(30) Foreign Application Priority Data

Nov. 26, 2014 (KR) .................. 10-2014-0166608

(51) Int. Cl.
 *G01S 15/02* (2006.01)
 *H04R 29/00* (2006.01)
 (Continued)

(52) U.S. Cl.
 CPC .............. *G01S 15/02* (2013.01); *G01D 21/00* (2013.01); *G01H 15/00* (2013.01);
 (Continued)

(58) Field of Classification Search
 CPC .... H04M 1/72454; H04M 1/18; G01D 21/00; G01H 15/00; G08B 13/19682;
 (Continued)

(56) References Cited

U.S. PATENT DOCUMENTS 4,125,021 A 11/1978 Kamei et al.
5,025,247 A 6/1991 Banks
 (Continued)

FOREIGN PATENT DOCUMENTS

CN 2414549 Y 1/2001
CN 1360689 A 7/2002
 (Continued)

OTHER PUBLICATIONS

European Search Report dated Jul. 19, 2018.
Chinese Search Report dated Mar. 4, 2019.

*Primary Examiner* — Maria El-Zoobi
(74) *Attorney, Agent, or Firm* — Cha & Reiter, LLC

(57) ABSTRACT

A method comprising: receiving, by an electronic device, a first signal having a first frequency; identifying, by the electronic device, at least one of a strength of the first signal or a signal-to-noise ratio of the first signal; outputting, by the electronic device, a second signal having a second frequency that is different from the first frequency, the second signal being output based on at least one of the strength of the first signal or the signal-to-noise ratio of the first signal; receiving the second signal by the electronic device; and detecting whether the electronic device is at least partially immersed in a liquid based on the received second signal.

14 Claims, 25 Drawing Sheets

(51) Int. Cl.

| | | |
|---|---|---|
| *H04M 1/18* | (2006.01) | |
| *G08B 13/196* | (2006.01) | |
| *H04W 24/00* | (2009.01) | |
| *H04B 11/00* | (2006.01) | |
| *H04W 88/02* | (2009.01) | |
| *H04M 1/72454* | (2021.01) | |
| *G01H 15/00* | (2006.01) | |
| *G01D 21/00* | (2006.01) | |
| *G01F 23/28* | (2006.01) | |
| *H04R 1/44* | (2006.01) | |
| *G01F 23/80* | (2022.01) | |

(52) U.S. Cl.
CPC ....... *G08B 13/19682* (2013.01); *H04B 11/00* (2013.01); *H04M 1/18* (2013.01); *H04M 1/72454* (2021.01); *H04R 29/001* (2013.01); *H04W 24/00* (2013.01); *H04W 88/021* (2013.01); *G01F 23/28* (2013.01); *G01F 23/80* (2022.01); *H04R 1/44* (2013.01)

(58) Field of Classification Search
CPC ..... H04B 11/00; H04R 29/001; H04W 24/00; H04W 88/021
USPC ............................................. 700/17
See application file for complete search history.

(56) References Cited

U.S. PATENT DOCUMENTS

| | | | |
|---|---|---|---|
| 2001/0050613 A1 | 12/2001 | Clark | |
| 2002/0021231 A1 | 2/2002 | Schlager et al. | |
| 2003/0034887 A1 | 2/2003 | Crabtree et al. | |
| 2008/0157970 A1 | 7/2008 | Single et al. | |
| 2009/0046075 A1* | 2/2009 | Kim ................ | H04M 1/72403 345/173 |
| 2013/0225237 A1 | 8/2013 | Minami | |
| 2013/0263251 A1* | 10/2013 | Fleizach ............ | G06F 21/36 726/19 |
| 2013/0339304 A1 | 12/2013 | Lee et al. | |
| 2014/0055388 A1* | 2/2014 | Yook ................ | G06F 3/0488 345/173 |
| 2015/0006875 A1* | 1/2015 | Jung ................ | G06F 9/4403 713/2 |

FOREIGN PATENT DOCUMENTS

| | | |
|---|---|---|
| CN | 103971406 A | 8/2014 |
| DE | 69635705 T2 | 8/2006 |
| JP | 2008-283406 A | 11/2008 |
| JP | 2012-119975 A | 6/2012 |
| KR | 10-2014-0023457 A | 2/2014 |
| KR | 10-2014-0038854 A | 3/2014 |

* cited by examiner

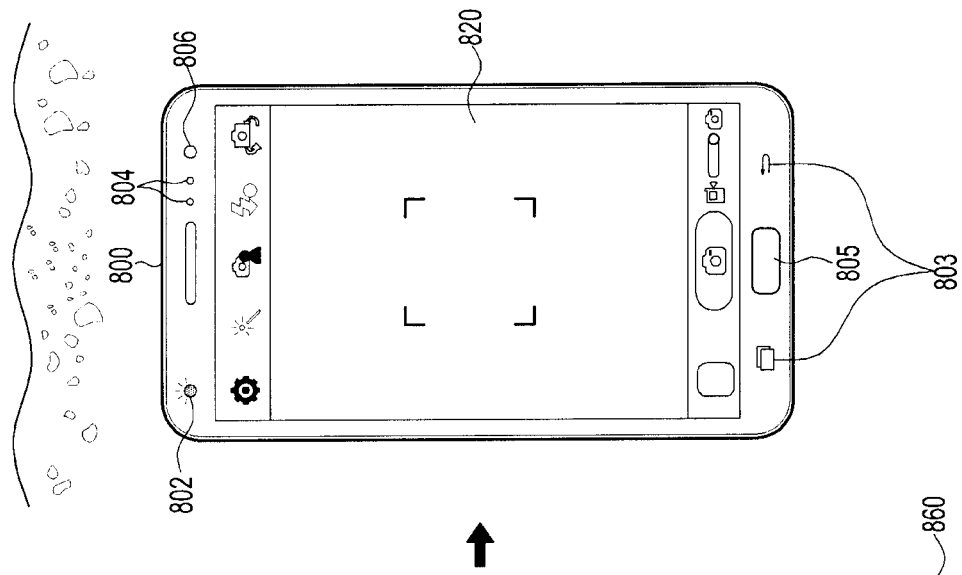
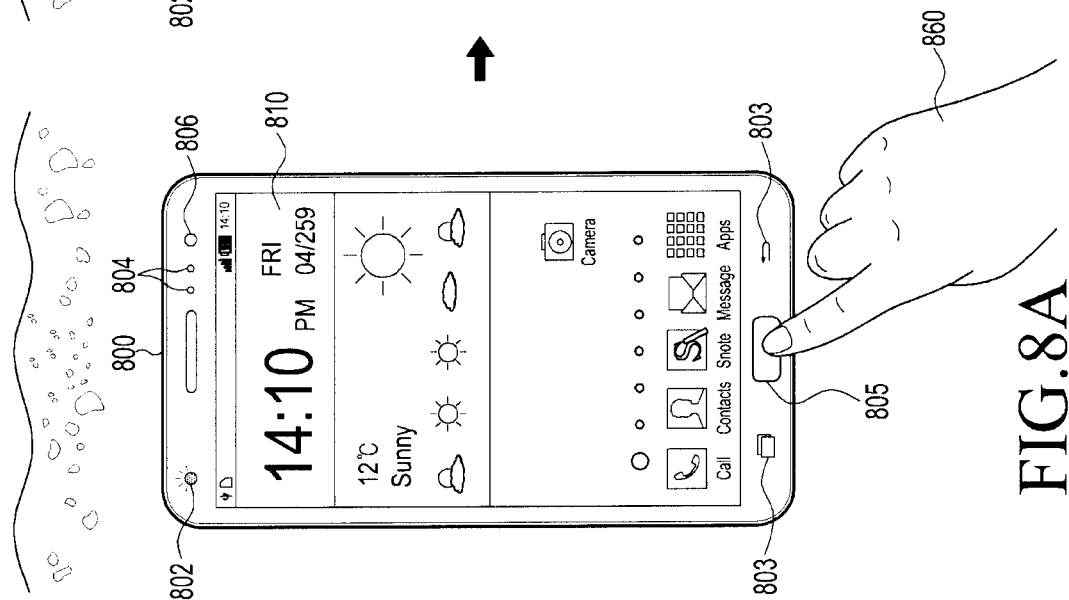
FIG.8B
FIG.8A

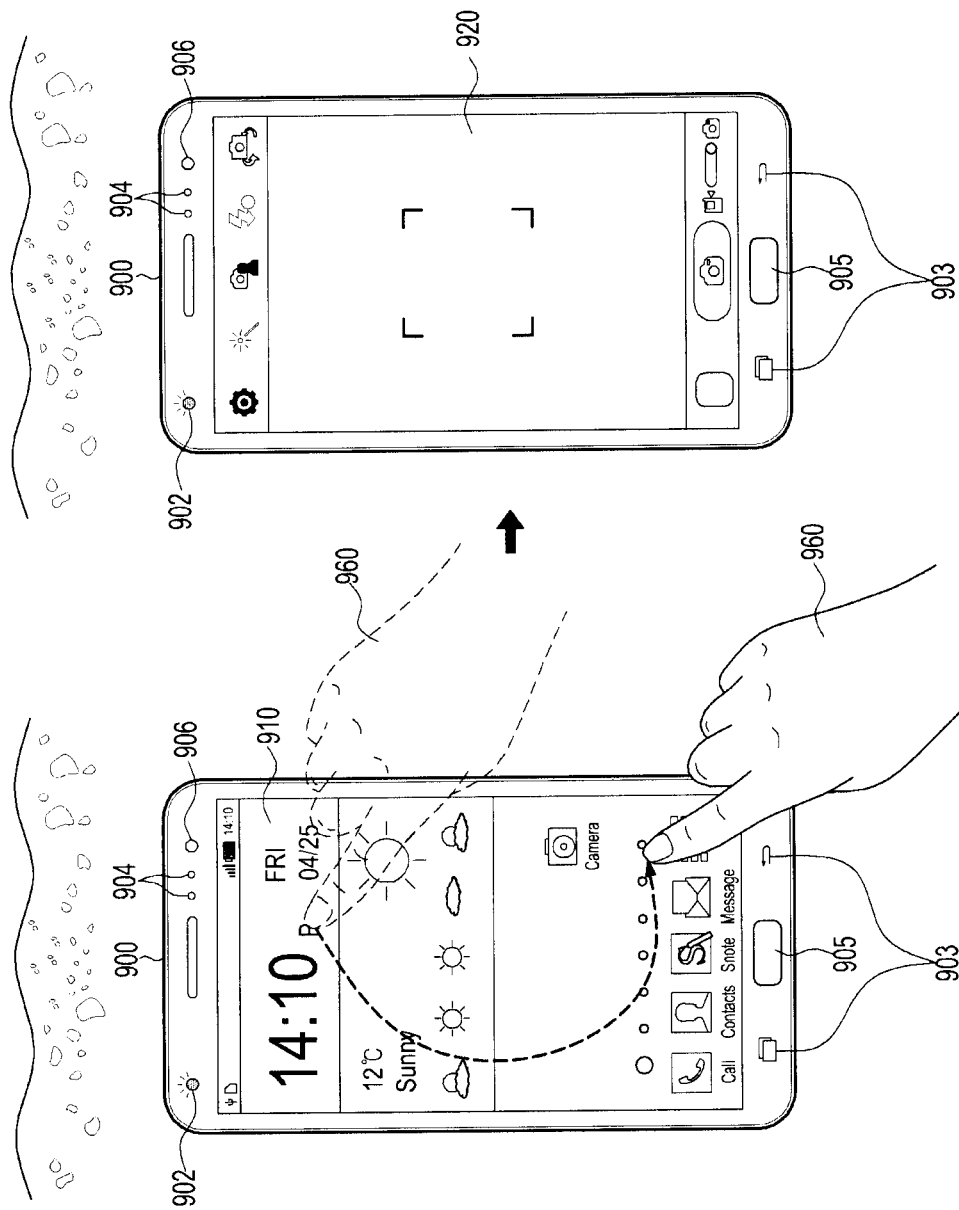

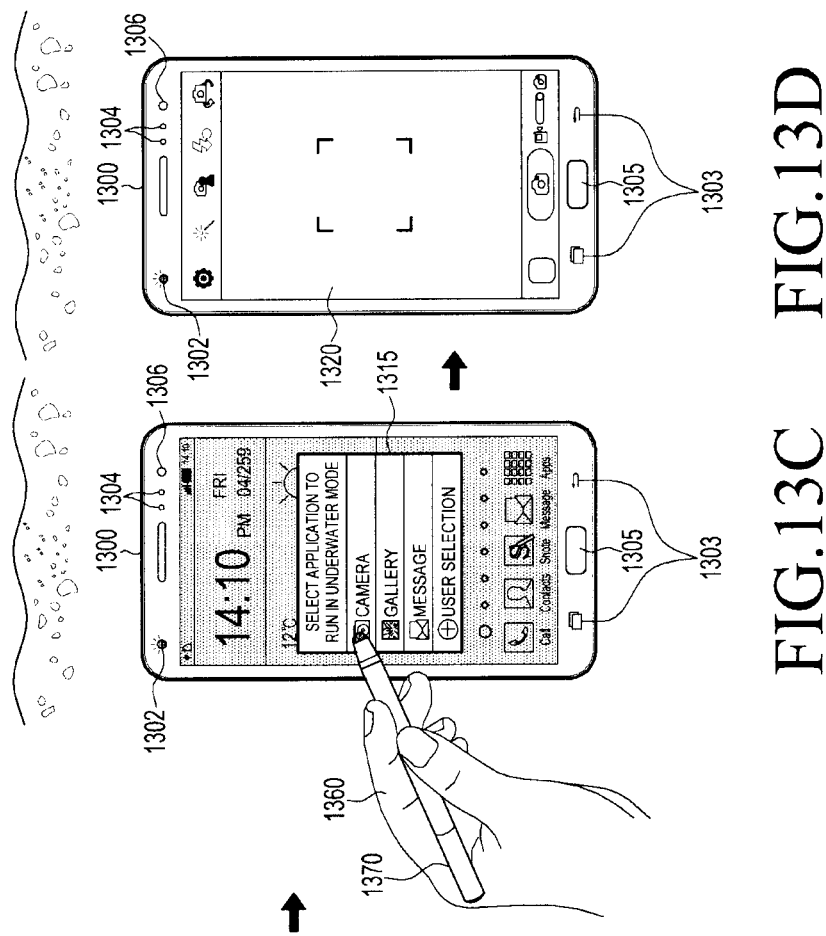
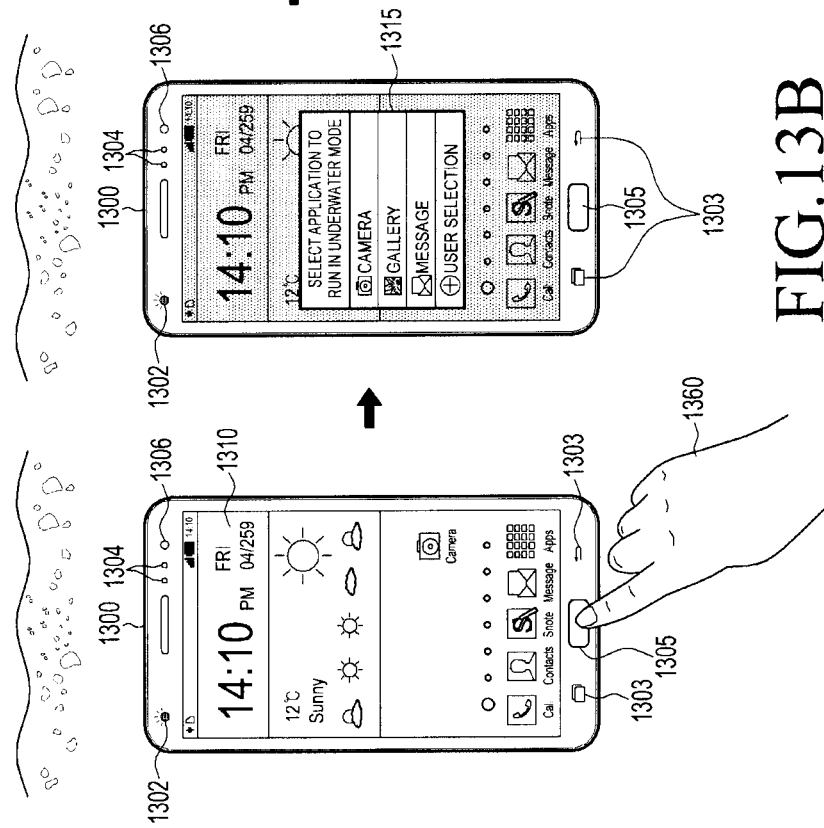
FIG.13A  FIG.13B  FIG.13C  FIG.13D

METHOD AND APPARATUS FOR DETECTING THAT A DEVICE IS IMMERSED IN A LIQUID

CROSS REFERENCE TO RELATED APPLICATIONS

This application is a Continuation of U.S. patent application Ser. No. 14/948,825 filed on Nov. 23, 2015 which claims the benefit under 35 U.S.C. § 119(a) of a Korean patent application filed in the Korean Intellectual Property Office on Nov. 26, 2014 and assigned Serial No. 10-2014-0166608, the entire disclosure of which is incorporated herein by reference.

TECHNICAL FIELD

The present disclosure relates to electronic devices, and more particularly to a method and apparatus for detecting that a device is immersed in a liquid.

BACKGROUND

The recent proliferation of smartphones or other electronic devices led to every folk owning one mobile device. This means that mobile devices became a critical part of our daily life and we cannot imagine life without such device. This phenomenon may be attributed to, among others, the portability of mobile devices. Indeed, the user carries his own electronic device most of the time in his daily life to obtain various types of information from the device.

This is also true when people attend leisure activity. Accordingly, such electronic devices come with various functions that attract users' attention during leisure time (e.g., mountain climbing, tracking, or swimming) as well as while they do routines. For example, electronic devices are equipped with various functions that may be useful for users' outdoor activities, including dust or water-proof capability that enables the devices to be used underwater.

As described above, the user of an electronic device may face an unexpected situation when carrying and using the electronic device. For example, the electronic device may be dropped into the water while in use. However, conventional non-waterproof electronic devices do not have any function or operation that may alert the user to that.

There are a few types of electronic devices with water-proof capability, but they primarily focus on preventing the electronic devices from malfunctioning underwater or while they are subject to the environment temporarily exposed to water or other liquids. Thus, such conventional electronic devices lack any functionality that enables the determination on whether they are positioned underwater.

Further, such conventional waterproof electronic devices may lack waterproofing and/or any functions or operations that enable the electronic devices to be controlled underwater.

The above information is presented as background information only to assist with an understanding of the present disclosure. No determination has been made, and no assertion is made, as to whether any of the above might be applicable as prior art with regard to the present disclosure.

SUMMARY

According to aspects of the disclosure, method is provided comprising: receiving, by an electronic device, a first signal having a first frequency; identifying, by the electronic device, at least one of a strength of the first signal or a signal-to-noise ratio of the first signal; outputting, by the electronic device, a second signal having a second frequency that is different from the first frequency, the second signal being output based on at least one of the strength of the first signal or the signal-to-noise ratio of the first signal; receiving the second signal by the electronic device; and detecting whether the electronic device is at least partially immersed in a liquid based on the received second signal.

According to aspects of the disclosure, an electronic device is provided, comprising: a wireless communication module; a first acoustic transducer; a second acoustic transducer; and at least one processor configured to: receive, via the wireless communication module, a first signal having a first frequency; identify at least one of a strength of the first signal or a signal-to-noise ratio of the first signal; output, via the first acoustic transducer, a second signal having a second frequency that is different from the first frequency, the second signal being output based on at least one of the strength of the first signal or the signal-to-noise ratio of the first signal; receive the second signal via the second acoustic transducer; and detect whether the electronic device is at least partially immersed in a liquid based on the received second signal.

According to aspects of the disclosure, a non-transitory computer-readable recording medium is provided that stores one or more processor-executable instructions, which when executed by at least one processor cause the processor to perform a method comprising the steps of: receiving a first signal having a first frequency; identifying at least one of a strength of the first signal or a signal-to-noise ratio of the first signal; outputting a second signal having a second frequency that is different from the first frequency, the second signal being output based on at least one of the strength of the first signal or the signal-to-noise ratio of the first signal; receiving the second signal; and detecting whether an electronic device, which the processor is part of, is at least partially immersed in a liquid based on the received second signal.

BRIEF DESCRIPTION OF THE DRAWINGS

Further appreciation of the present disclosure and many of the attendant aspects thereof will be readily obtained as the same becomes better understood by reference to the following detailed description when considered in connection with the accompanying drawings, wherein:

FIG. 8A is a diagram illustrating an example of the operation of an electronic device, according to an embodiment of the disclosure;

FIG. 8B is a diagram illustrating an example of the operation of an electronic device, according to an embodiment of the disclosure;

FIG. 9A is a diagram illustrating an example of the operation of an electronic device, according to an embodiment of the disclosure;

FIG. 9B is a diagram illustrating an example of the operation of an electronic device, according to an embodiment of the disclosure;

FIG. 13A is a diagram illustrating an example of the operation of an electronic device, according to an embodiment of the disclosure;

FIG. 13B is a diagram illustrating an example of the operation of an electronic device, according to an embodiment of the disclosure;

FIG. 13C is a diagram illustrating an example of the operation of an electronic device, according to an embodiment of the disclosure;

FIG. 13D is a diagram illustrating an example of the operation of an electronic device, according to an embodiment of the disclosure;

DETAILED DESCRIPTION

Figure 1:
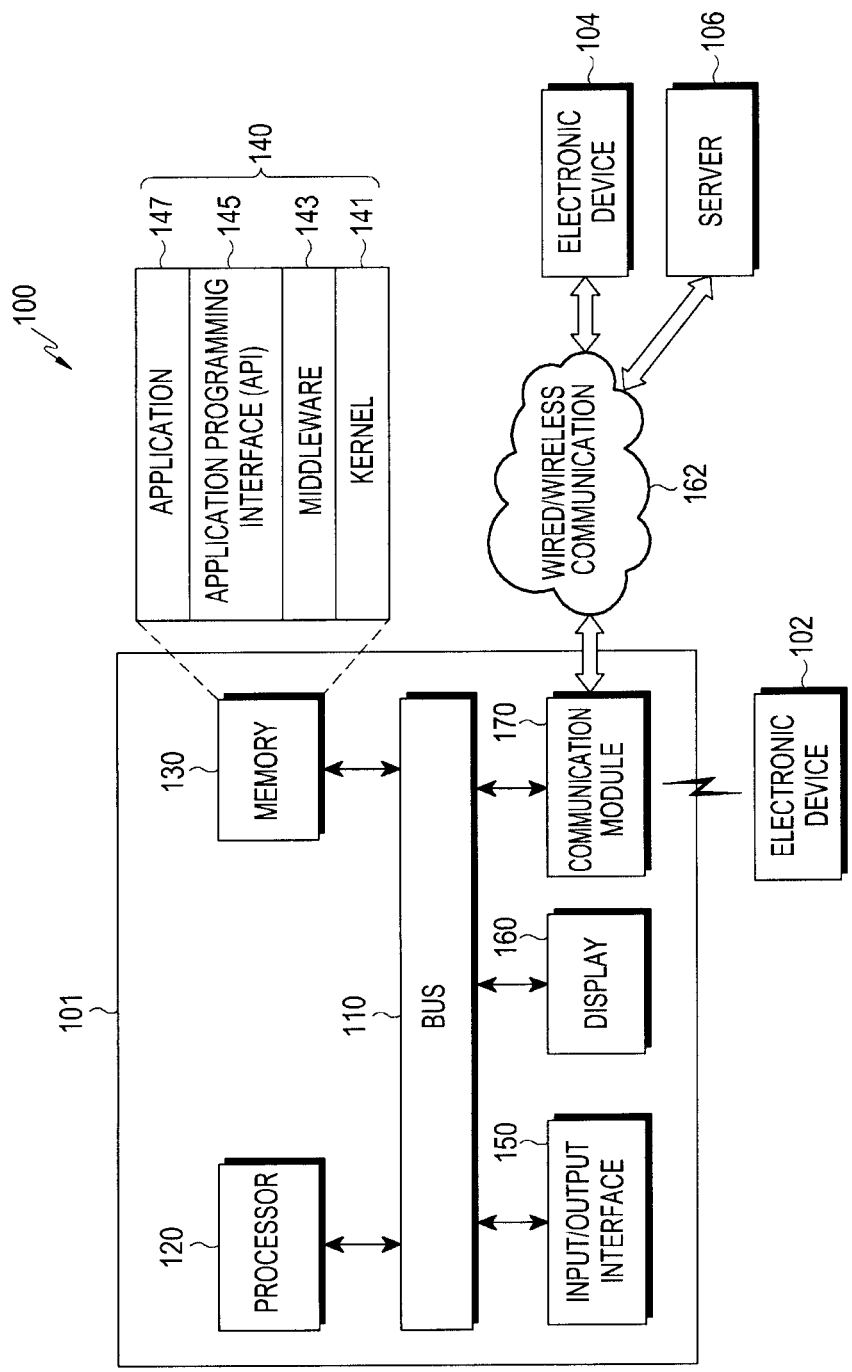
FIG. 1 is a diagram of an example of a network environment, according to an embodiment of the present disclosure.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the electronic device may be a smart home appliance. For example, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, the electronic device may be part of a furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an electronic device that possesses artificial intelligence) using the electronic device.

FIG. 1 is a diagram of an example of a network environment, according to an embodiment of the present disclosure. As illustrated in FIG. 1, an electronic device 101 may be included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processor 120 may include one or more processors. Any of the processors may include one or more of a central processing unit (CPU), an application processor (AP), or a communication processor (CP), a general-purpose processor (e.g., ARM-based processors), a Digital Signal Processor (DSP), a Programmable Logic Device (PLD), an Application-Specific Integrated Circuit (ASIC), a Field-Programmable Gate Array (FPGA), and/or any other suitable type of processing circuitry. The processor 120 may perform control on at least one of the other components of the electronic device 101, and/or perform an operation or data processing relating to communication.

The memory 130 may include any suitable type of volatile or non-volatile memory, such as Random Access Memory (RAM), Read-Only Memory (ROM), Network Accessible Storage (NAS), cloud storage, a Solid State Drive (SSD), etc. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided by the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light-emitting diode (LED) display, an organic light-emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected to the network 162 through wireless or wired communication to communicate with the external electronic device.

The wireless communication may use at least one of, e.g., long-term evolution (LTE), long-term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS). The network 162 may include at least one of a telecommunication network, e.g., a computer network (e.g., local area network (LAN) or wide area network (WAN)), the Internet, or a telephone network.

The first and second external electronic devices 102 and 104 each may be a device of the same or different type than the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
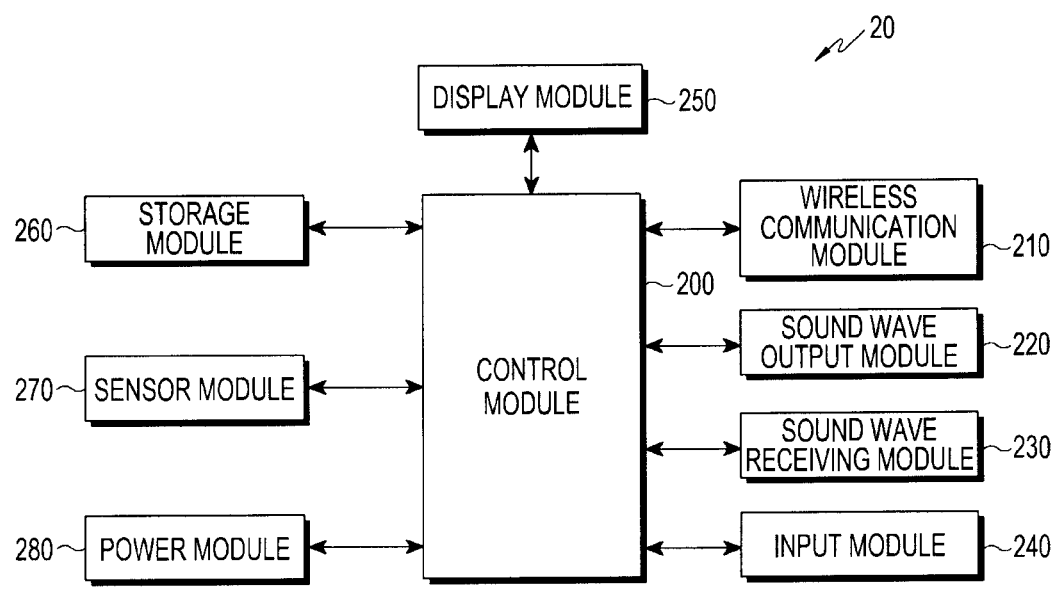
FIG. 2 is a is a diagram of an example of an electronic device, according to an embodiment of the present disclosure.

FIG. 2 is a diagram of an example of an electronic device, according to an embodiment of the present disclosure.

According to an embodiment of the present disclosure, the electronic device 20 may include a control module 200, a wireless communication module 210, a sound wave output module 220, a sound wave receiving module 230, an input module 240, a display module 250, a storage module 260, a sensor module 270, and a power module 280.

The control module 200 may include one or more processors. Any of the processors may include one or more of a central processing unit (CPU), an application processor (AP), or a communication processor (CP), a general-purpose processor (e.g., ARM-based processors), a Digital Signal Processor (DSP), a Programmable Logic Device (PLD), an Application-Specific Integrated Circuit (ASIC), a Field-Programmable Gate Array (FPGA), and/or any other suitable type of processing circuitry. The control module 200 may execute operation or data processing regarding the control and/or communication of, e.g., at least one other components of the electronic device 20 (e.g., the wireless communication module 210, the sound wave output module 220, the sound wave receiving module 230, the input module 240, the display module 250, the storage module 260, the sensor module 270, and the power module 280). According to aspects of the present disclosure, the function(s) or operation(s) performed by the control module 200 may be executed by, e.g., the processor 120.

The wireless communication module 210 may receive radio frequency (RF) signals. The RF signals may include at least one of, e.g., a wireless fidelity (Wi-Fi) signal, a Bluetooth (BT) signal, a near field communication (NFC) signal, a global positioning system (GPS) signal, an FM/AM radio signal, or a signal of cellular communication (e.g., long-term evolution (LTE), LTE-advanced (LTE-A), code division multiple access (CDMA), wideband CDMA (WCDMA), universal mobile telecommunications service (UMTS), wireless broadband (WiBro) or global system for mobile communications (GSM). The control module 200 may monitor the RF signals received by the wireless communication module 210. According to aspects of the present disclosure, such RF signal may be referred to as a first signal.

The sound wave output module 220 may perform control to output a sound wave having a predetermined frequency (e.g., an inaudible frequency of 10 KHz) depending on variations in the amplitude and/or frequency of the first signal. The 10 KHz inaudible frequency is provided as an example, and the sound wave may have other various frequencies. The variations in the amplitude and/or frequency may come from, e.g., differences in the mediums through which the first signal is transmitted. The sound wave output module 220 may include any suitable type of acoustic transducer, such as a speaker for example. According to aspects of the present disclosure, the sound wave may be referred to as a second signal.

The sound wave receiving module 230 may receive a sound wave output from the sound wave output module 220. The sound wave receiving module 230 may include any suitable type of acoustic transducer, such as a microphone for example.

The input module 240 may include, e.g., a touch panel, a pen sensor, a key, or an ultrasonic input device. The touch panel may recognize touch inputs in at least one of capacitive, resistive, infrared, or ultrasonic methods. With the capacitive method, physical contact or proximity detection may be possible. The touch panel may further include a tactile layer. In this regard, the touch panel may provide the user with a tactile response. The pen sensor may be implemented in a well-known fashion. The key may include e.g., a physical button, optical key or keypad. The ultrasonic input device may use an input tool that generates an ultrasonic signal and enable the electronic device 20 to identify data by sensing the ultrasonic signal to a microphone (e.g., a microphone 1788).

The display module 250 may display various types of information (e.g., multimedia data or text data) to the user. For example, the display module 250 may display a list of applications that may be run when the electronic device is underwater. According to aspects of the present disclosure, the function(s) or operation(s) performed by the control module 200 may be executed by, e.g., the display 160.

The storage module 260 may store commands or data received from the control module 200 or other components (e.g., the wireless communication module 210, the sound wave output module 220, the sound wave receiving module 230, the input module 240, the display module 250, the storage module 260, the sensor module 270, and the power module 260) or commands or data generated by the processor 120 or other components. For example, the storage module 260 may retain data regarding a reference signal to determine a variation in the first signal.

The sensor module 270 may measure a physical quantity or detect an operational stage of the electronic device 20, and the sensor module 270 may convert the measured or detected information into an electrical signal. The sensor module 270 may include at least one of, e.g., a gesture sensor, a gyro sensor, an atmospheric pressure sensor, a magnetic sensor, an acceleration sensor, a grip sensor, a proximity sensor, a color sensor, such as an RGB (Red, Green, and Blue) sensor, a biosensor, a temperature/humidity sensor, an illumination sensor, or an Ultra Violet (UV) sensor. The sensor module 270 may sense various events inputted to the electronic device 20 to control the electronic device when the electronic device is underwater. The sensor module 270 may further include a control circuit for controlling at least one or more of the sensors included in the sensing module.

The power module 280 may be controlled to supply power to various components of the electronic device 20 (e.g., the control module 200, the wireless communication module 210, the sound wave output module 220, the sound wave receiving module 230, the input module 240, the display module 250, the storage module 260, and the sensor module 270). The power module 280 may include, e.g. a battery, but is not limited thereby, and the power module 280 may include various modules that may supply power to various components of the electronic device 20.

Figure 3:
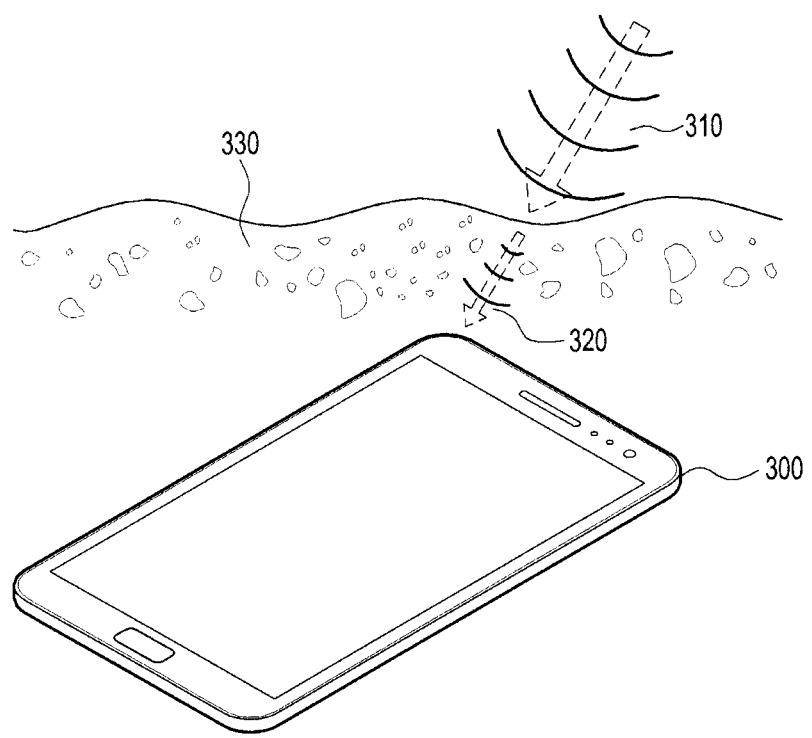
FIG. 3 is a diagram illustrating the effect of water on signals transmitted and received by an electronic device when the electronic device is positioned underwater, according to an embodiment of the present disclosure.

FIG. 3 is a diagram illustrating the effect of water on signals transmitted and received by an electronic device when the electronic device is positioned underwater, according to an embodiment of the present disclosure.

Referring to FIG. 3, according to an embodiment of the present disclosure, the electronic device 300 may be positioned underwater 330. This may happen, e.g., when the user of the electronic device 300 accidentally drops the electronic device 300 in the water 330 or when the user unintentionally carries the electronic device 300 into the water.

As shown in FIG. 3, when the electronic device 300 is underwater 330, the RF signals 310 and 320 may experience attenuation due to differences in the media across which the RF signals 310 and 320 travel. In other words, the RF signal 310 traveling in the air may have a greater strength than the RF signal 320 traveling underwater. The strength may be assessed based on any suitable type of measure, such as dBm which may be obtained by representing the mW unit of power in the dB scale. FIG. 4 illustrates actual examples regarding the description of FIG. 3.

Figures 4A, 4B:
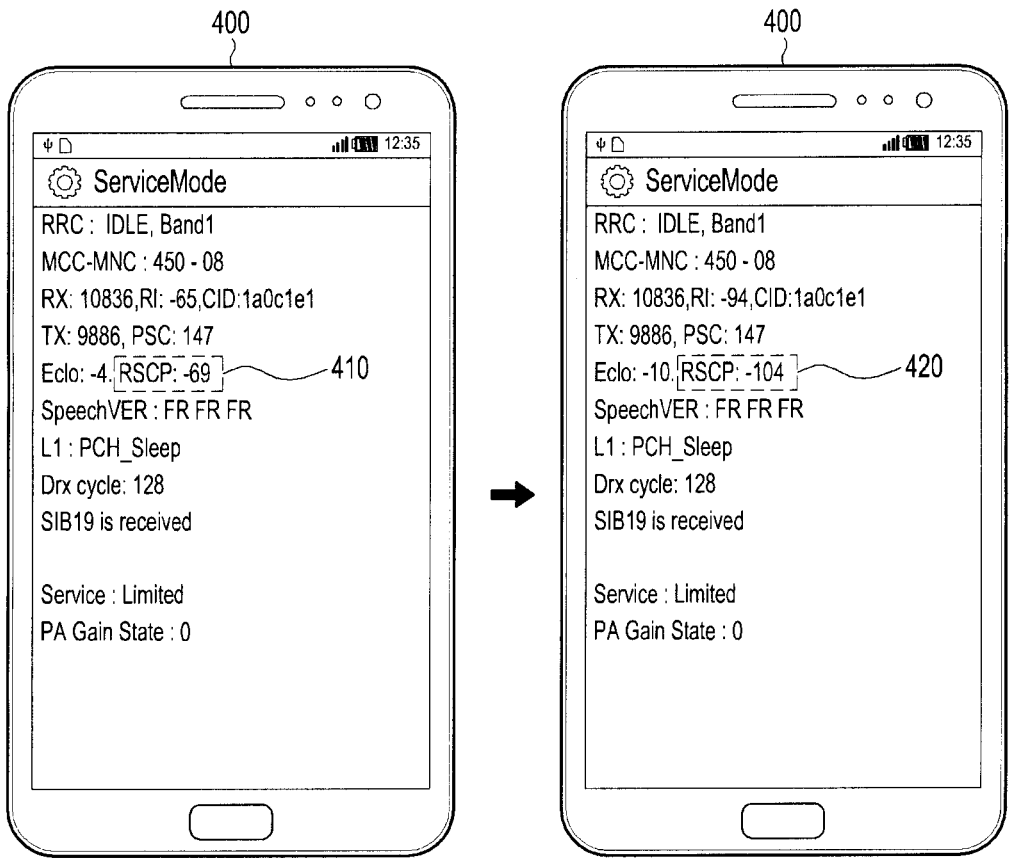
FIG. 4A is a diagram of an example of a signal monitoring screen that can be displayed when an electronic device is not immersed in water, according to an embodiment of the present disclosure.
FIG. 4B is a diagram of an example of a signal monitoring screen that can be displayed when an electronic device is immersed in water, according to an embodiment of the present disclosure.

FIG. 4A is a diagram of an example of a signal monitoring screen that can be displayed when the electronic device 400 is not immersed in water, according to an embodiment of the present disclosure.

Referring to FIG. 4A, the control module (e.g., the control module 200) of the electronic device 400 may monitor the first signal and may display the result of monitoring the first signal. The monitoring result may be displayed as, e.g., a received signal code power (RSCP) value 410. However, the RSCP shown in FIG. 4A is provided only as an example, and instead of RSCP, any other suitable type of parameter may be used that is related to the strength (RF signal level) of the first signal (e.g., reference signal received power (RSRP), received signal strength indicator (RSSI), etc.). Furthermore, according to an embodiment of the present disclosure, the monitoring result may be numerically displayed through various signal-to-noise-ratio-related parameters (e.g., Ec/Io, Eb/No).

FIG. 4B is a diagram of an example of a signal monitoring screen that can be displayed when the electronic device 400 is immersed in water, according to an embodiment of the present disclosure. As illustrated, when the electronic device is immersed in water, an attenuated first signal may be received due to differences in the media through which the signal travels. Accordingly, as shown in FIG. 4B, a reduced RSCP value 420 may be measured and subsequently displayed by the electronic device 400.

Figure 4C:
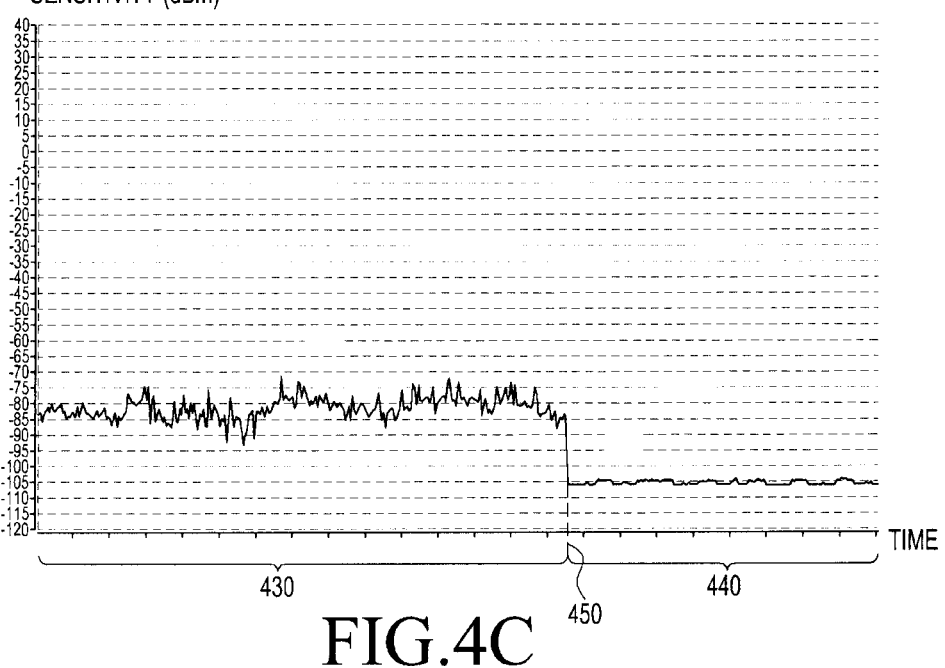
FIG. 4C depicts a plot of signal strength values measured by the electronic device 300 over a given time period, according to an embodiment of the present disclosure.

FIG. 4C depicts a plot of signal strength values measured by the electronic device 400 over a given time period, according to an embodiment of the present disclosure. As illustrated, the strength 430 of the first signal when the electronic device is not immersed in water is greater than the strength 440 of the first signal when the electronic device is underwater. According to an embodiment of the present disclosure, the second signal may be output at a triggering point 450, in response to the strength of the first signal falling below a predetermined threshold.

Figure 5A:
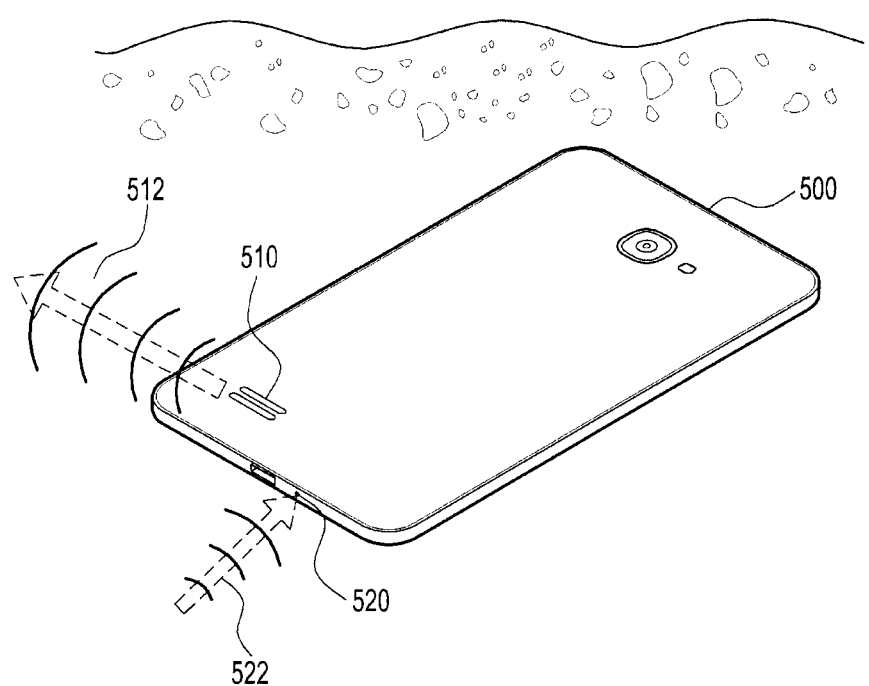
FIG. 5A is a diagram illustrating the operation of an electronic device when the electronic device is located underwater, according to an embodiment of the present disclosure.

FIG. 5A is a diagram illustrating the operation of an electronic device when the electronic device is located underwater, according to an embodiment of the present disclosure. Referring to FIG. 5A, according to an embodiment of the present disclosure, when the electronic device 500 is underwater, the sound wave output module (e.g., the speaker 510) may output a second signal (e.g., the sound wave 512) having a predetermined frequency (e.g., the inaudible frequency of 10 KHz) when a change in the strength of the first signal is sensed (i.e., the triggering point). The second signal may then be received by a sound wave receiving module (e.g., a microphone) of the electronic device 500.

Figure 5B:
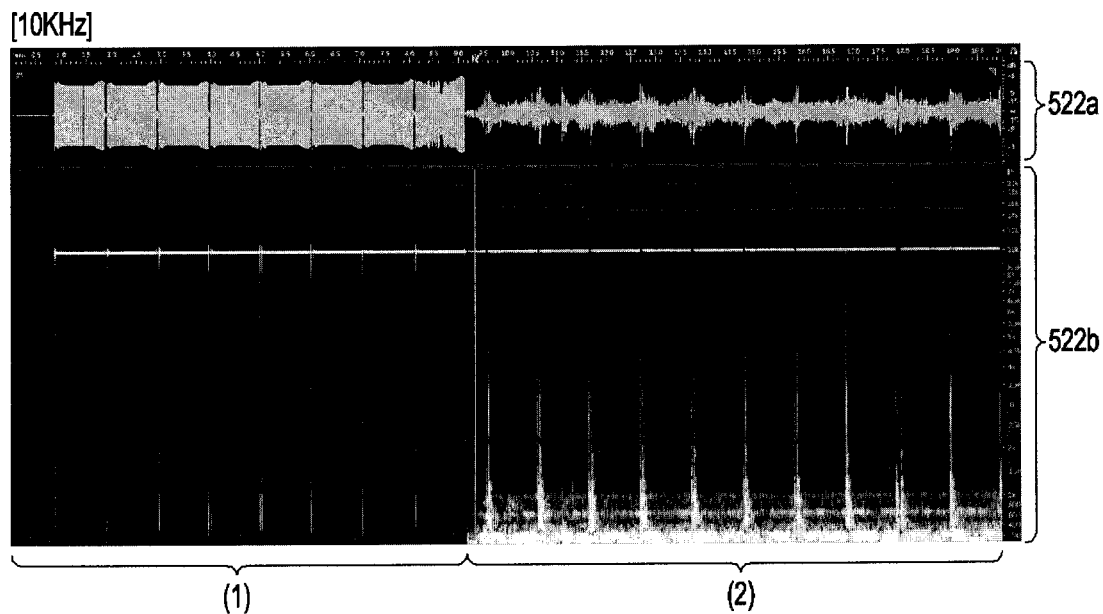
FIG. 5B is a diagram illustrating the attributes of a signal that is output by an electronic device during a period in which the electronic device is situated above water and a period in which the electronic device is located underwater, according to an embodiment of the present disclosure.
Figure 5C:
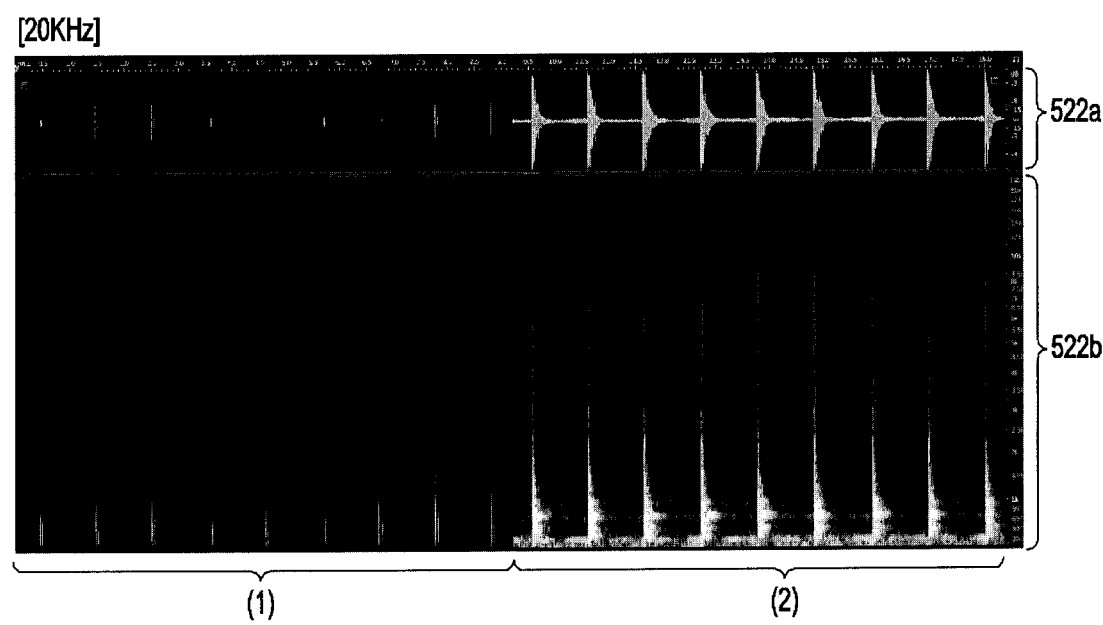
FIG. 5C is a diagram illustrating the attributes of a signal that is output by an electronic device during a period in which the electronic device is situated above water and a period in which the electronic device is located underwater, according to an embodiment of the present disclosure.

FIG. 5B and FIG. 5C are diagrams illustrating the attributes of a second signal that is output by an electronic device during a period in which the electronic device is situated above water (e.g., in the air) and a period in which the electronic device is located underwater, according to an embodiment of the present disclosure. More particularly, FIG. 5B illustrates the frequency and amplitude of the second signal as the second signal travels above water during period (1), and then underwater during period (2). As illustrated, when the frequency of the second signal is 10 KHz, and the second signal is propagating underwater, the second signal exhibits a reduced amplitude 522*a* or a different frequency characteristic 522*b* as compared with the frequency and amplitude when the second signal is propagating through the air. That is, when the second signal propagates underwater, the high-frequency components of the signal are reduced while its low-frequency components are exaggerated as compared with when the second signal propagates through air.

FIG. 5C is a diagram illustrating the frequency and amplitude of the second signal as the second signal travels above water during period (1) and then under water during period (2). As illustrated in FIG. 5C, when the frequency of the second signal is 20 KHz, and the second signal is propagating underwater, the second signal exhibits an increased amplitude 522*a* or a different frequency characteristic 522*b* as compared with when the second signal is propagating through the air. That is, when the second signal having a frequency of 20 KHz propagates underwater, the high-frequency components of the second signal are reduced while the low-frequency components are exaggerated in comparison to when the second signal is propagating through the air.

A storage module (e.g., the storage module 260) may retain data identifying various characteristics of a signal when the signal travels through a first medium (e.g., water) and through a second medium (e.g., air), and how those characteristics change when the signal transitions from one medium to the other. For example, the data may represent a waveform (hereinafter "reference waveform") and it may be used to determine whether the electronic device is underwater. The reference waveform may include a waveform when the second signal having a predetermined frequency (e.g., 10 kHz) propagates underwater. Additionally or alternatively, the reference waveform may include a waveform when the second signal having the predetermined frequency propagates in the air. The data may include various elements of the waveform (e.g., the reference waveform), such as data regarding the amplitude and/or frequency of the waveform.

When the second signal is received by the electronic device, the control module of the electronic device (e.g., the control module 200) may compare the reference waveform with the waveform of the received second signal to determine whether the electronic device 500 is positioned underwater. Additionally or alternatively, the control module may compare another reference waveform with the waveform of the received second signal to determine whether the electronic device 500 is positioned underwater.

According to aspects of the present disclosure, the first signal may include a radio frequency (RF) signal, and the second signal may include an acoustic signal (e.g., a sound wave).

According to aspects of the present disclosure, the sound wave output module (e.g., the sound wave output module 220) may include a speaker, and the sound wave receiving module (e.g., the sound wave receiving module 230) may include a microphone.

According to aspects of the present disclosure, the RF signal may include any suitable type of signal, such as a Wi-Fi signal, a Bluetooth signal, an NFC signal, a GPS signal, an LTE signal, an LTE-A signal, a CDMA signal, a WCDMA signal, a UMTS signal, a WiBro signal, a GSM signal, or an FM/AM radio signal.

According to aspects of the present disclosure, the control module (e.g., the control module 200) may compare the reference waveform stored in the electronic device with the waveform of the received second signal.

According to aspects of the present disclosure, the control module may determine that at least a portion of the electronic device is positioned underwater when the reference waveform matches the waveform of the received second signal. Alternatively, the control module may determine that at least a portion of the electronic device is positioned underwater when the reference waveform is different from the waveform of the received second signal. The reference waveform form may be considered to match the waveform of the measured signal when one or more characteristics of the reference waveform are identical to respective characteristics of the measured second signal. Additionally or alternatively, the reference waveform form may be considered to match the waveform of the measured signal when one or more characteristics of the reference waveform are within a predetermined distance from respective characteristics of the measured second signal. According to aspects of the disclosure, the term "reference waveform" may refer to any suitable type of data item and/or data set that identifies one or more characteristics of a reference wave, such as frequency, power, amplitude, etc. Thus, comparing the reference waveform to the waveform of the second signal may include comparing a characteristic of the second signal (e.g., frequency, amplitude, etc.) to a corresponding reference value that is part of the waveform.

Figure 6:
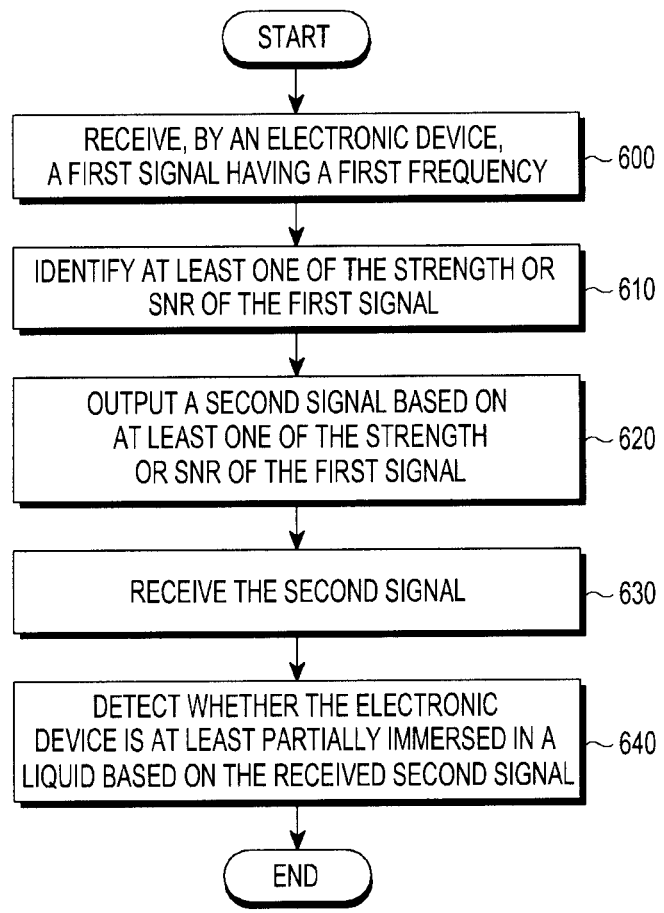
FIG. 6 is a flowchart of an example of a process, according to an embodiment of the present disclosure.

FIG. 6 is a flowchart of an example of a process, according to an embodiment of the present disclosure.

In operation 600, a first signal having a first frequency is received by an electronic device. The first signal is received from an external electronic device through a wireless communication module (e.g., the wireless communication module 210).

At operation 610, the electronic device identifies at least one of the strength of the first signal or a signal-to-noise ratio of the first signal.

At operation 620, the electronic device outputs a second signal having a second frequency different from the first frequency based on at least one of the strength of the first signal or the signal-to-noise ratio.

At operation 630, the electronic device receives the second signal.

At operation 640 the electronic device detects whether it is at least partially immersed in a liquid. For example, the electronic device may detect whether at least a portion of the electronic device is positioned underwater based on a characteristic of the received second signal.

According to aspects of the present disclosure, the first signal may include a radio frequency (RF) signal, and the second signal may include a sound wave.

According to aspects of the present disclosure, the operation of outputting the second signal may include outputting a sound wave using a speaker included in the electronic device, and the operation of receiving at least a portion of the second signal may include an operation of receiving the outputted sound wave using a microphone included in the electronic device.

According to aspects of the present disclosure, the RF signal may include any suitable type of signal, such as a Wi-Fi signal, a Bluetooth signal, an NFC signal, a GPS signal, an LTE signal, an LTE-A signal, a CDMA signal, a WCDMA signal, a UMTS signal, a WiBro signal, a GSM signal, or an FM/AM radio signal.

According to aspects of the present disclosure, the operation of determining whether at least a portion of the electronic device is positioned underwater may include comparing a reference waveform stored in the electronic device with a waveform of the received second signal.

According to aspects of the present disclosure, the operation of determining whether at least a portion of the electronic device is at least partially immersed in a liquid may include detecting that at least a portion of the electronic device is positioned underwater when the reference waveform matches the waveform of the received second signal.

According to aspects of the present disclosure, the operation of determining whether at least a portion of the electronic device is positioned underwater may include detecting that at least a portion of the electronic device is positioned underwater when the reference waveform does not match the waveform of the received second signal.

Figure 7A:
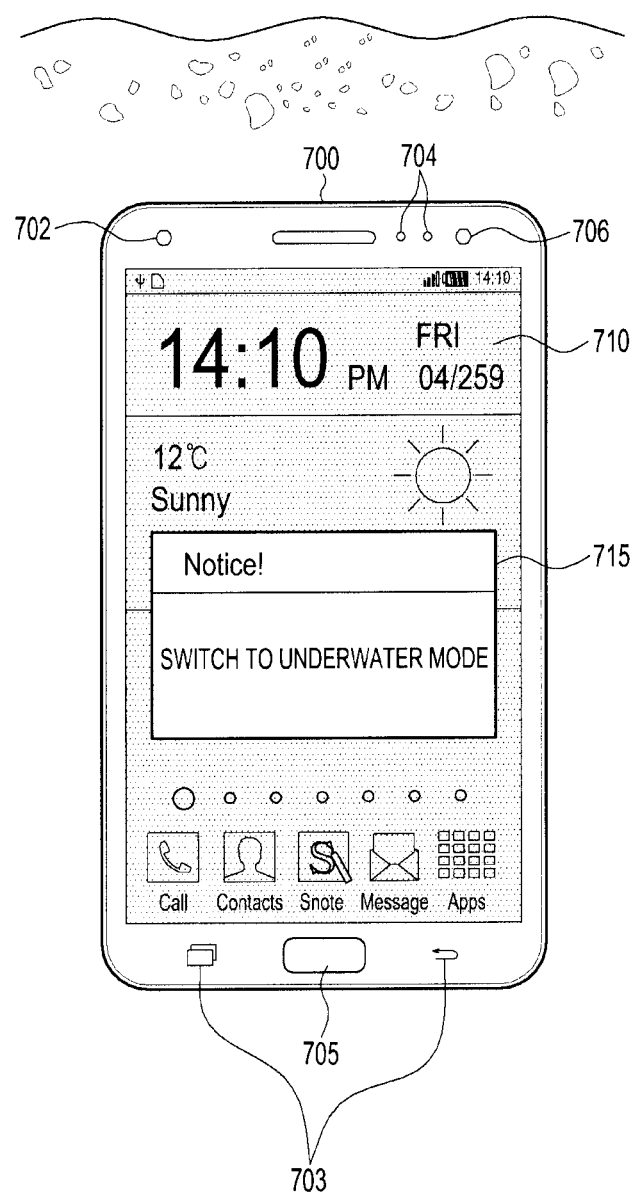
FIG. 7A is a diagram illustrating an example of the operation of an electronic device, according to an embodiment of the disclosure.
Figure 7B:
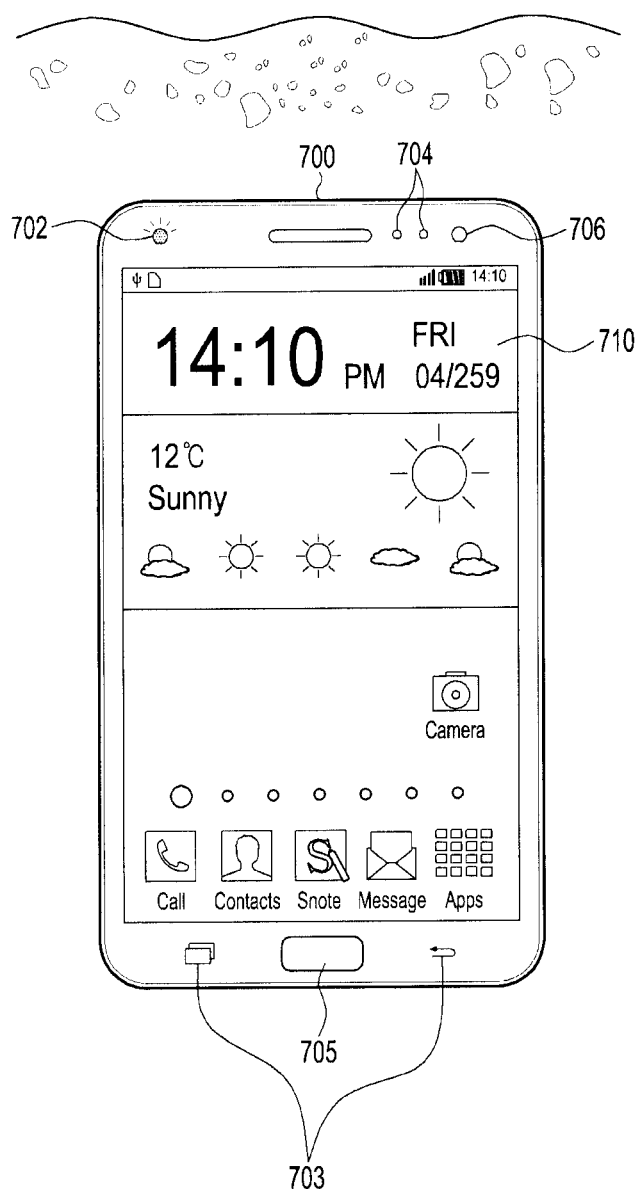
FIG. 7B is a diagram illustrating an example of the operation of an electronic device, according to an embodiment of the disclosure.

FIGS. 7A-7B are diagrams illustrating an example of the operation of an electronic device 700, according to an embodiment of the disclosure. According to this example, the electronic device 700 is waterproof and capable of operating underwater at a predetermined water pressure.

Referring to FIG. 7A, when the waveform data of a received second signal matches predetermined underwater waveform data, the electronic device 700 may be transitioned to a state in which the electronic device is configured to perform one or more predetermined operations in response to input that is considered suitable for underwater use. For example, the electronic device 700 may be transitioned into an "underwater mode." According to aspects of the disclosure, the electronic device may be transitioned into the underwater mode by a control module that is part of the electronic device 700, such as the control module 200.

As shown in FIG. 7A, the electronic device 700 may display a notification message 715 to indicate entry into the underwater mode when the electronic device is transitioned into the underwater mode. More particularly, a home screen 710 may be displayed on the background of a notification message 715. Upon entry into the underwater mode, the control module may turn off (or otherwise disable) the touch key 703 of the electronic device 700. Doing so may reduce malfunctions that may be caused by the water.

Next, as shown in FIG. 7B, the electronic device 700 may hide the notification message 715 and activate an indicator 702 showing that the electronic device 700 currently operates in the underwater mode. The indicator 702 may include various light-emitting devices (e.g., an LED module). The user of the electronic device 700 may identify that the electronic device 700 is currently in the underwater mode through the notification indicated via the indicator 702.

FIGS. 8A-11 are diagrams illustrating examples of the operation of an electronic device, according to various embodiments of the disclosure. More particularly, FIGS. 8-11 illustrate function(s) or operation(s) performed by the electronic device when the electronic device is at least partially immersed in a liquid.

Referring to FIG. 8A, when receiving an input to the physical key 805 in the underwater mode (e.g., an input of pressing the key for a predetermined time), the electronic device may execute (e.g., launch) a predetermined application 820 as shown in FIG. 8B. More particularly, FIG. 8B illustrates an example of the execution of a camera application as an embodiment of the application. The predetermined application 820 may be an application designated by the user (e.g., the user 860) prior to the entry into the underwater mode (i.e., when the electronic device 800 is underwater). The user may designate at least one application predicted to be used frequently in the underwater mode as the predetermined application via a user interface that is available on the electronic device. The control module may cause the execution of the predetermined application (and/or the display of its interface) to be toggled on and off by repeated input to the physical key 805.

Figures 10A, 10B:
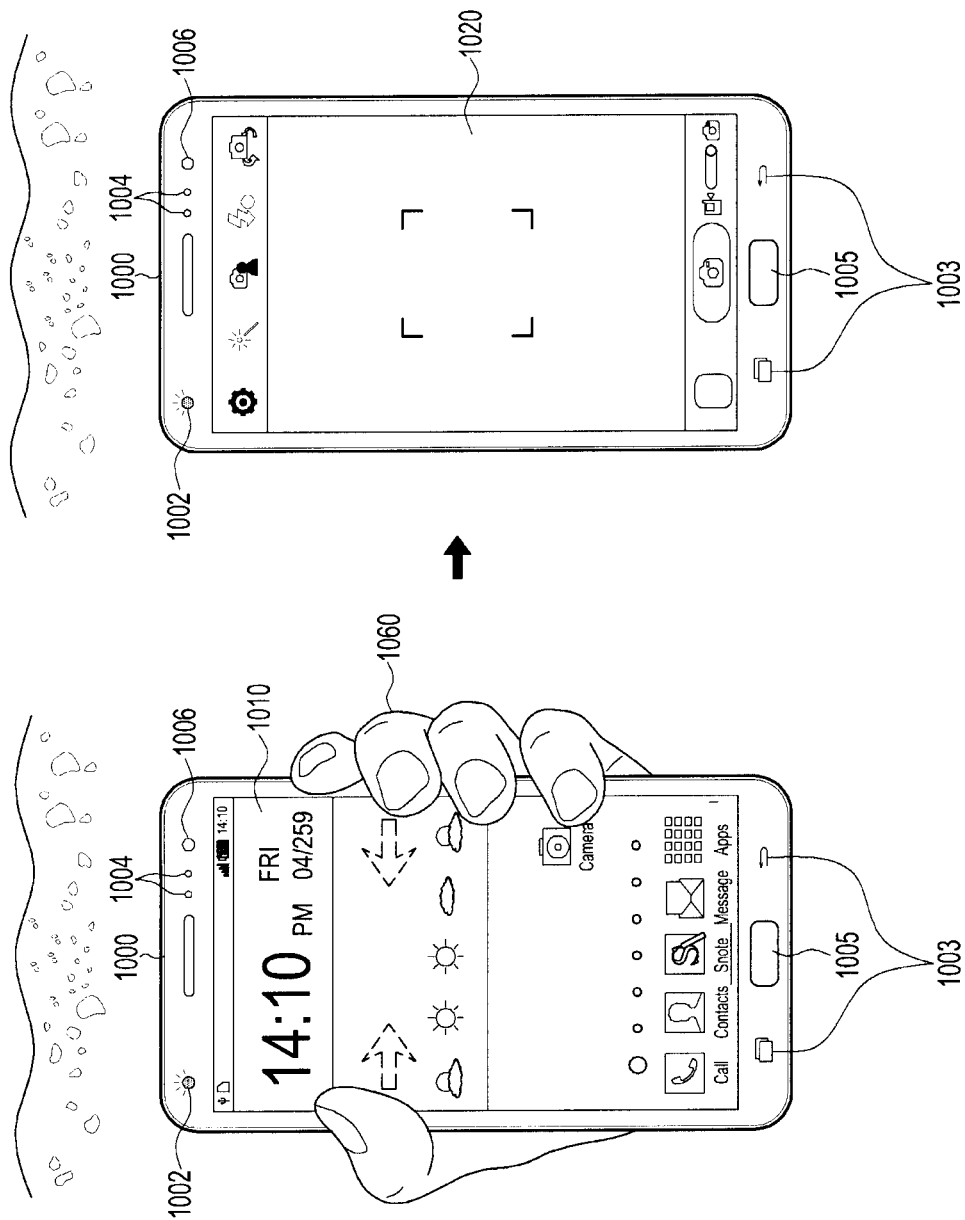
FIG. 10A is a diagram illustrating an example of the operation of an electronic device, according to an embodiment of the disclosure.
FIG. 10B is a diagram illustrating an example of the operation of an electronic device, according to an embodiment of the disclosure.

Referring to FIG. 9A, another example is shown in which a predetermined application is executed in the underwater mode. As illustrated, when a motion gesture is received from the user, an application corresponding to the motion gesture may be run. The motion gesture may include a hovering action performed adjacently to the electronic device 900, rather than as a direct touch to the electronic device. The motion gesture and the application corresponding to the motion gesture may be designated by the user, e.g., before entry into the underwater mode. That is, the user may designate the motion gesture and the application corresponding to the motion gesture prior to the entry into the underwater mode. FIG. 9A illustrates an example in which the character "C" is designated as the motion gesture, and a motion defining the shape of the character "C" occurs adjacently to the electronic device 900 as the motion gesture. When the motion gesture is performed, the sensor module 904 may recognize the motion gesture generated, and the control module may perform control to run a predetermined application (e.g., the camera application 920) corresponding to the motion gesture as shown in FIG. 9B Referring to FIG. 10A, the electronic device 1000 may use a grip of the user 1060 on the electronic device as a basis for controlling the electronic device. The grip of the user 1060 may be sensed through any suitable type of sensor, such as a grip sensor included in the electronic device 1000. When the grip of the user 1060 is sensed by the grip sensor, the electronic device may execute a predetermined application as shown in FIG. 10B.

Figure 11:
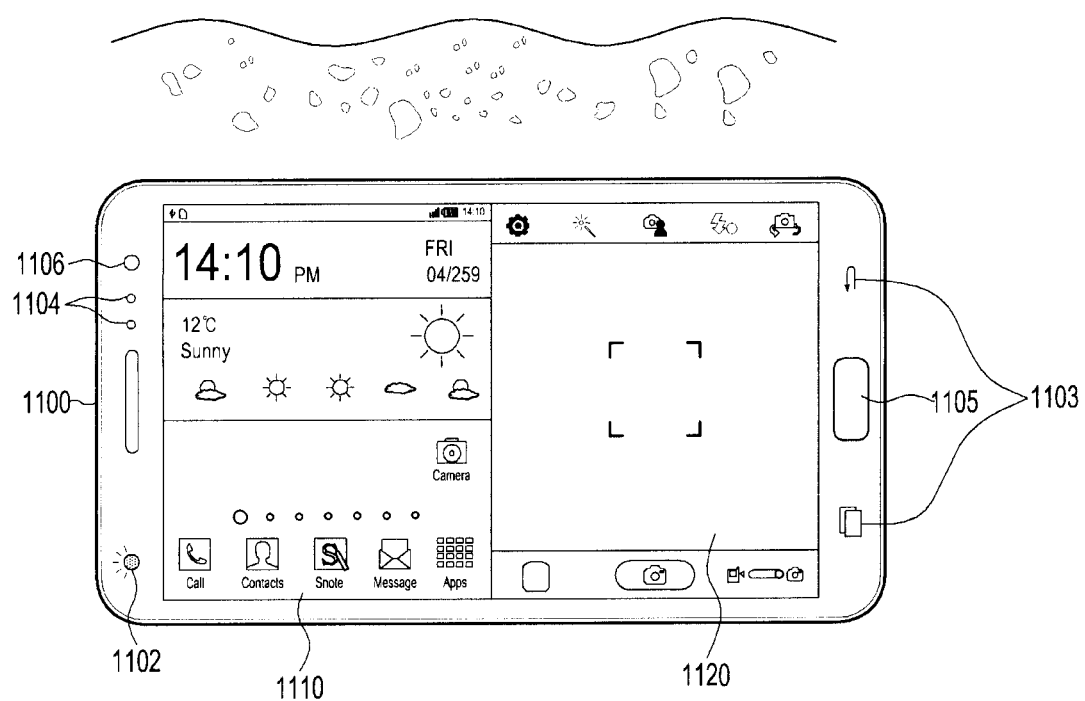
FIG. 11 is a diagram illustrating an example of the operation of an electronic device, according to an embodiment of the disclosure.

Referring to FIG. 11, when the electronic device enters the underwater mode, the predetermined application 1120 may be displayed in a split screen mode along with an object (e.g., the home screen 1110) that was displayed by the electronic device immediately before the entry into the underwater mode. The user may control each of a plurality of screens displayed on the electronic device 1100 in the underwater mode.

FIGS. 12A-13D are diagrams illustrating examples of the operation of an electronic device, according to an embodiment of the present disclosure. More particularly, FIGS. 12A-13D illustrate an example in which at least one application is executed by the electronic device when the electronic device is situated underwater.

Figures 12A, 12B:
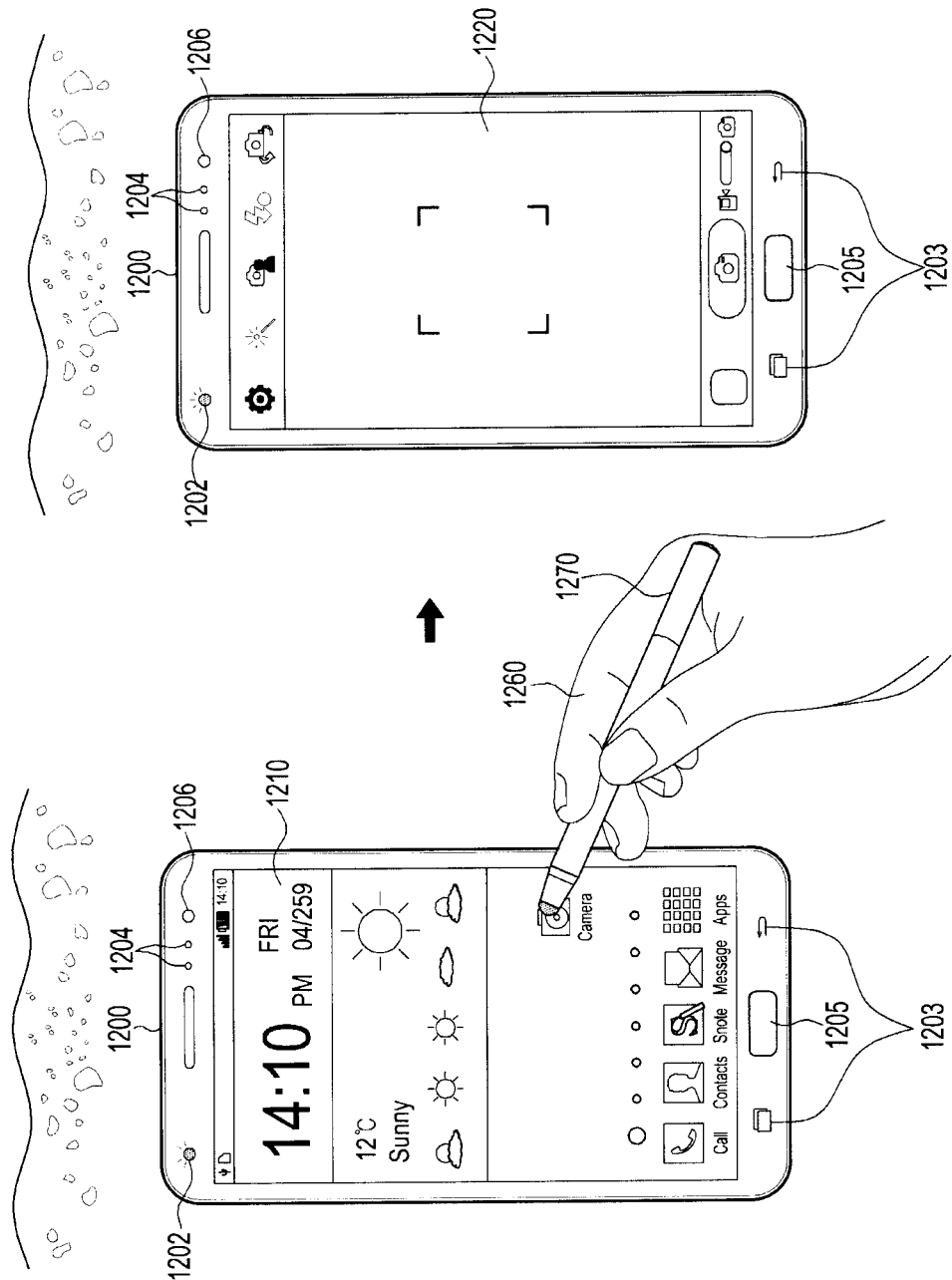
FIG. 12A is a diagram illustrating an example of the operation of an electronic device, according to an embodiment of the disclosure.
FIG. 12B is a diagram illustrating an example of the operation of an electronic device, according to an embodiment of the disclosure.

Referring to FIG. 12A, the electronic device 1200 may receive a touch input through an input means 1270 (e.g., Wacom Pen™). The input means 1270 may include at least one of an electromagnetic resonance (EMR) type, a capacitive type, an infrared (IR) type, or an ultrasonic type. The electronic device 1200, upon reception of the touch input, may execute an application (e.g., the camera application 1220) selected by the touch input as shown in FIG. 12B. The user may designate an application to be run in the underwater mode through a direct touch input on the electronic device 1200 via the input means 1270.

Referring to FIG. 13A, the electronic device 1300 may receive an input to the physical key 1305 (e.g., pressing the physical key 1305 for a predetermined time or more) of the electronic device 1300 while the electronic device 1300 is in the underwater mode. When receiving the input to the physical key 1305, the electronic device 1300 may display a list 1315 of applications executable in the underwater mode as shown in FIG. 13B. The application list 1315 displayed may include only application(s) executable in the underwater mode and may omit applications that have not been selected for execution while the electronic device is in the underwater mode. For example, the application(s) included in the application list 1315 may be previously designated by the user (e.g., the user 1360) or specified when the electronic device 1300 is manufactured. FIG. 13B depicts an example in which a "camera application," "gallery application," and "message application" are identified in the list as applications executable in the underwater mode. Furthermore, the user may add to the application list 1315 at least one application executable in the underwater mode by selecting the "user selection" option from application list 1315.

FIG. 13C illustrates an example in which the "camera application" is selected as a result of being selected with the input means 1370. Afterwards, the electronic device 1300 may execute the "camera application" while underwater, as shown in FIG. 13D.

According to aspects of the present disclosure, when the electronic device is positioned underwater, the control module may transition the electronic device to a state in which the electronic device is configured to perform one or more predetermined operations in response to input that is considered suitable for underwater use. More particularly, when the electronic device is in the underwater mode, detecting any such input may cause the electronic device to generate a control event that triggers the performance of a predetermined operation. According to aspects of the present disclosure, the control event may be generated in response to at least one of pressing a physical key (e.g., the physical key 1305) of the electronic device (e.g., the electronic device 1300), a motion gesture, a grip on the electronic device, and a touch through an input means electrically recognizable by the electronic device. According to aspects of the disclosure, the control event may be generated only when the electronic device is in the underwater mode.

According to aspects of the present disclosure, when at least one application (e.g., the camera application 1320) is selected from the application list 1315, the control module may display the user interface of the selected application in a split screen mode along with the object or screen displayed immediately before the electronic device is positioned underwater.

Figure 14:
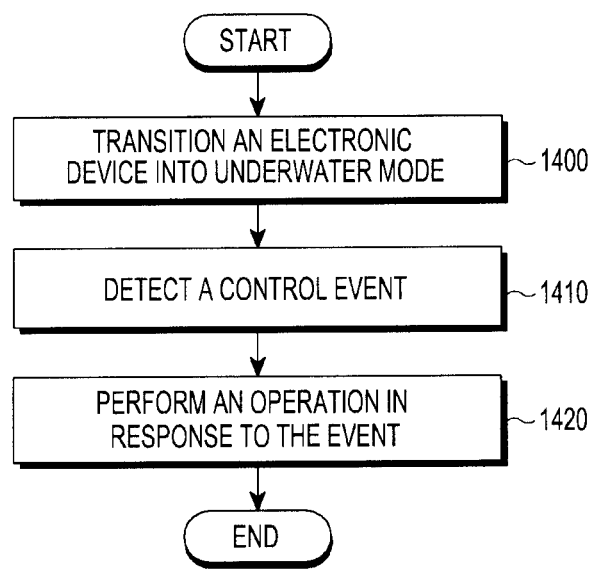
FIG. 14 is a flowchart of an example of a process, according to an embodiment of the present disclosure.

FIG. 14 is a flowchart of an example of a process, according to an embodiment of the present disclosure. According to the process, the electronic device may enter the underwater mode (1400) and detect a control event while the electronic device is underwater (in other words, in the underwater mode) (1410). Afterwards, in response to the event, the electronic device may perform an operation associated with the event while the electronic device is in the underwater mode (1420).

According to aspects of the present disclosure, when the electronic device is positioned underwater, the electronic device may be transitioned to a state in which the electronic device is configured to perform one or more predetermined operations in response to input that is considered suitable for underwater use. More particularly, when the electronic device is in the underwater mode, detecting any such input may cause the electronic device to generate a control event that triggers the performance of a predetermined operation.

According to aspects of the present disclosure, the control event may be generated in response to at least one of a pressing a physical key of the electronic device, a motion gesture, a grip on the electronic device, and a touch on the electronic device that is performed through an input means electrically recognizable by the electronic device.

According to aspects of the present disclosure, a list may be displayed of applications executable while the electronic device is underwater (e.g., the application list 1315).

According to aspects of the present disclosure, when at least one application is selected from the application list, the user interface of the selected application may be displayed along with the object (or screen) displayed on the electronic device immediately before the electronic device is immersed in the water.

FIGS. 15A-F are diagrams illustrating an example of the operation of an electronic device, according to an embodiment of the present disclosure. It is assumed that in the example of FIGS. 15A-F, the electronic device lacks waterproofing and may sustain damage when it is immersed in water.

Figure 15A:
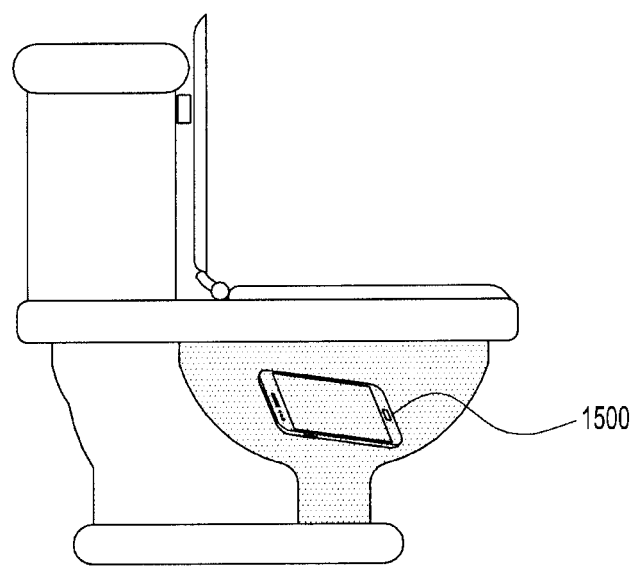
FIG. 15A is a diagram illustrating an example of the operation of an electronic device, according to an embodiment of the disclosure.
Figure 15B:
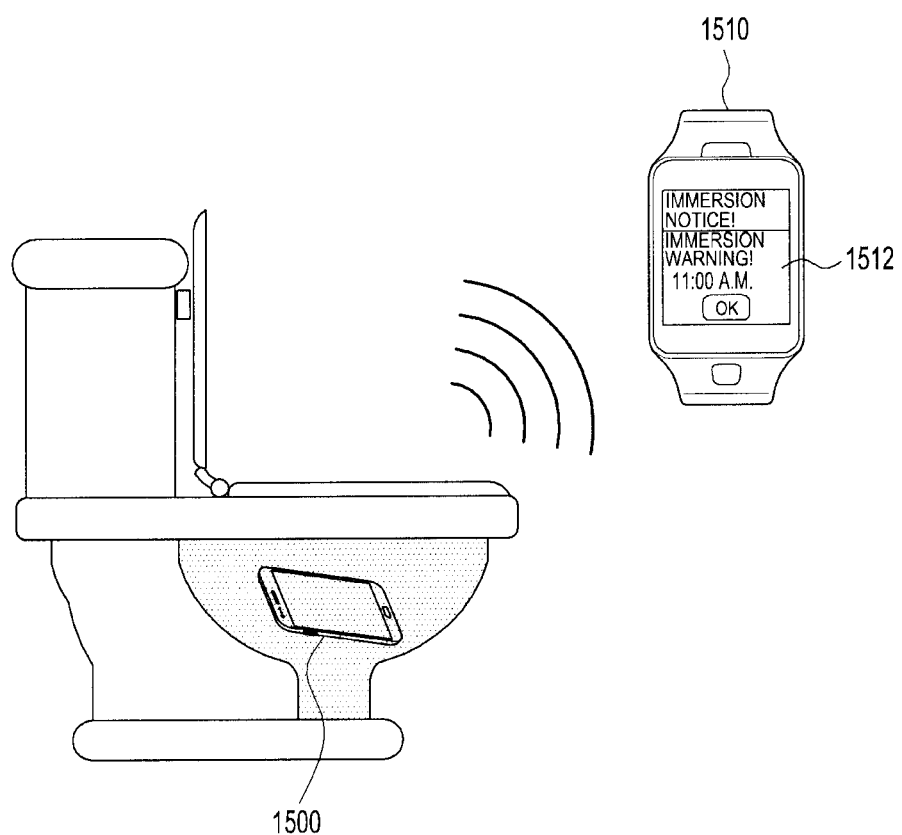
FIG. 15B is a diagram illustrating an example of the operation of an electronic device, according to an embodiment of the disclosure.

As illustrated, the electronic device 1500 may be unintentionally immersed in water. FIG. 15A illustrates an example in which the electronic device is dropped in water. When determining that the electronic device is at least partially immersed in water (or another type of liquid) according to a variation in the second signal, the electronic device 1500 may request a wearable electronic device 1510 connected to the electronic device 1500 via wireless communications to notify the user of the immersion. As shown in FIG. 15B, in response to the request, the wearable electronic device 1510 may display an immersion notification message. According to an embodiment of the present disclosure, together with the immersion notification message, the wearable electronic device 1510 may receive from the electronic device 1500 an indication of the time of immersion. The indication of the time of the immersion may be subsequently displayed on the wearable electronic device 1510. To that end, the electronic device 1500 may identify the time when the electronic device 1500 was immersed and send the same to the wearable electronic device 1510. The function or operation of displaying the immersion notification message 1512 on the wearable electronic device 1510 may be controlled by the control module (e.g., the control module 200) of the electronic device 1500 and/or by a separate control module (not shown) included in the wearable electronic device 1510.

Figure 15C:
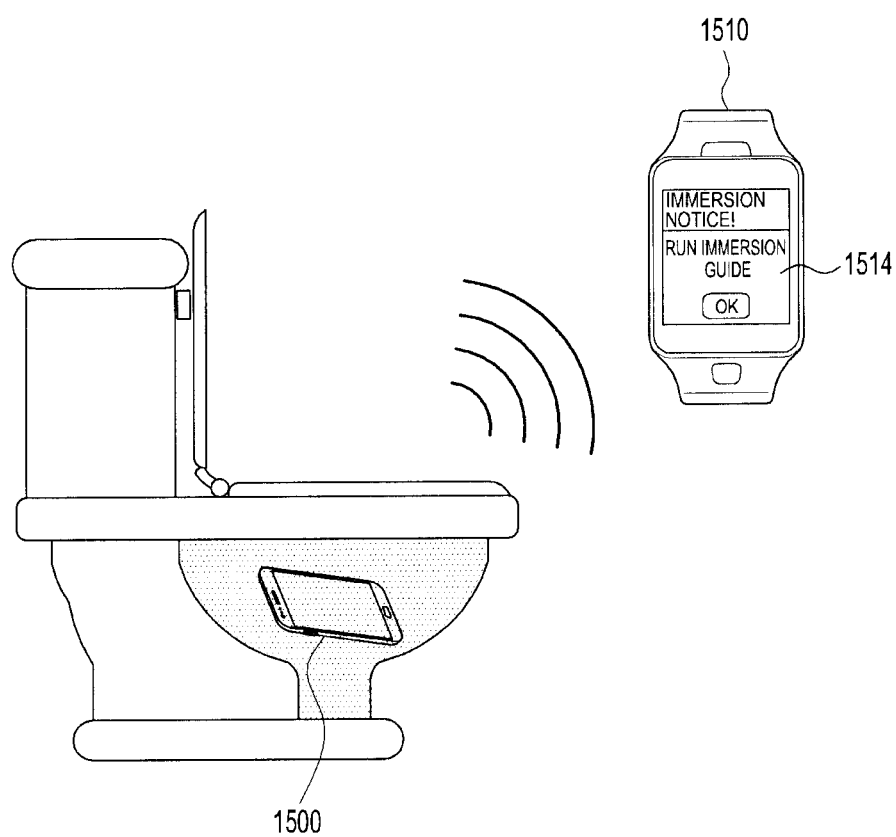
FIG. 15C is a diagram illustrating an example of the operation of an electronic device, according to an embodiment of the disclosure.

Referring to FIG. 15C, when detecting that the electronic device is immersed in water according to a variation in the second signal, the electronic device 1500 may request the wearable electronic device 1510 connected to the electronic device 1500 via wireless communications to provide to the user guide information indicating when the electronic device 1500 is immersed. In response to the request, the wearable electronic device 1510 may display a first aid guide selection menu 1514. The user may cause the first aid guide to be displayed by selecting the "identify" icon in the first aid guide selection menu 1514.

Figure 15D:
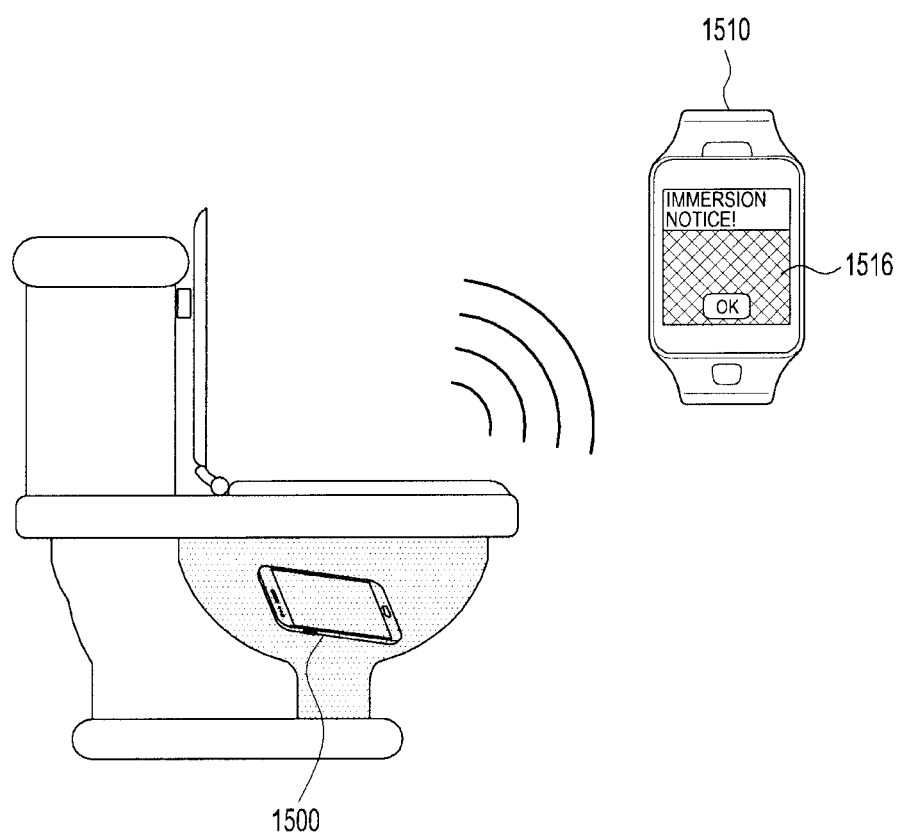
FIG. 15D is a diagram illustrating an example of the operation of an electronic device, according to an embodiment of the disclosure.

Referring to FIG. 15D, the electronic device 1500 may photograph its surroundings in response to detecting that the electronic device 1500 is at least partially immersed in the water and send the captured image data to the wearable electronic device 1510. The image data may include a still image 1516 or video. FIG. 15D illustrates an example in which a still image 1516 is displayed on the wearable electronic device 1510. The wearable electronic device 1510 may receive the image data from the electronic device 1500 and display it on the wearable electronic device 1510. The user of the electronic device 1500 may become aware of the exact position of the electronic device 1500 as a result of the image being transmitted from the electronic device 1500.

Figure 15E:
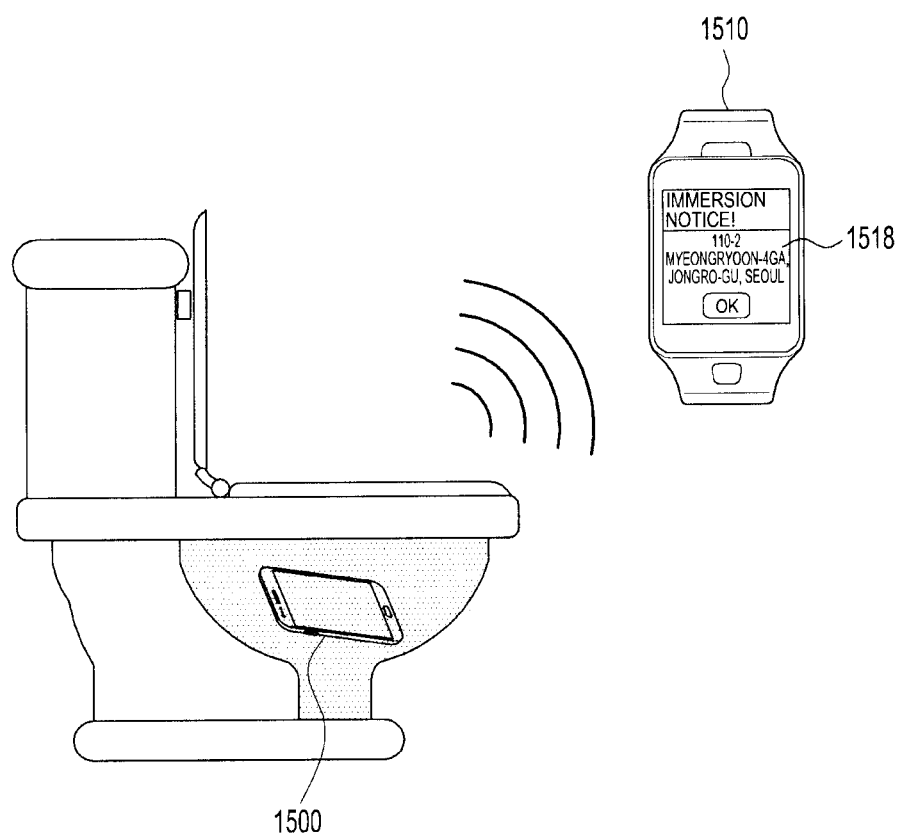
FIG. 15E is a diagram illustrating an example of the operation of an electronic device, according to an embodiment of the disclosure.

Referring to FIG. 15E, the electronic device 1500 may obtain location information in response to detecting that the electronic device 1500 is at least partially immersed in the water and send the obtained location information 1518 to the wearable electronic device 1510. The location information 1518 may be acquired by using any suitable type of device, such as a GPS module. The wearable electronic device 1510 may receive the location information 1518 from the electronic device 1500 and display it on the wearable electronic device 1510. The user of the electronic device 1500 may become aware of the exact position of the electronic device 1500 as a result of the location information 1518 being transmitted from the electronic device 1500.

Figure 15F:
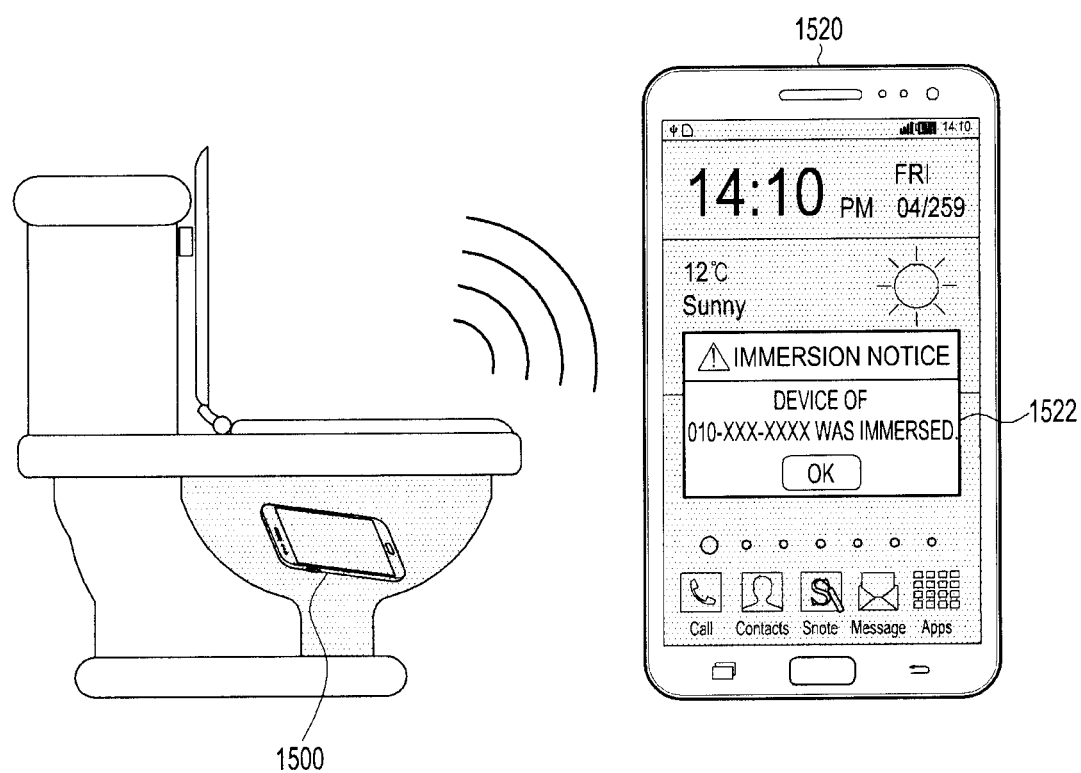
FIG. 15F is a diagram illustrating an example of the operation of an electronic device, according to an embodiment of the disclosure.

Referring to FIG. 15F, the electronic device 1500 may send a request to a predetermined designated electronic device (e.g., a third party's device 1520) to display an immersion notification message 1522 indicating that the electronic device 1500 is immersed in the water. The request may be transmitted to the designated electronic device 1520 in response to detecting the electronic device 1500 is at least partially immersed in the water.

The designated electronic device 1520 may be an electronic device previously designated by the user of the electronic device 1500 before the electronic device 1500 is immersed. The immersion notification message 1522 may be displayed on the designated electronic device 1520 in response to the request, as shown in FIG. 15F. In some implementations, the notification message 1522 may be displayed together with a unique identifier corresponding to the electronic device 1500 (e.g., a phone number). In some implementations, the electronic device 1520 may be designated to receive the request in the event the electronic device 1500 is immersed in water through, e.g., the phone number of the designated electronic device 1520. However, the phone number is only one possible way to identify the designated electronic device 1520, and, therefore, any other suitable type of unique identifier may be used instead.

When the electronic device 1500 detects that it is at least partially immersed in water, the electronic device 1500 may save (in other words, "backup") various types of data stored in the electronic device 1500 on at least one of the wearable electronic device 1510, the designated electronic device 1520, and a backup server (e.g., the server 106). The stored data may include any suitable type of data that is pre-designated by the user for back-up in the event that the electronic device is immersed in water. According to aspects of the disclosure, the user may designate various types of data to be backed up when the electronic device 1500 is immersed, up to a predetermined data storage limit in anticipation of the immersion. The designation of data may be performed by the operation of designating the path or address of the data, for example. The data to be backed up may include data related to the immersion (e.g., location information at the time of immersion) generated or obtained by the electronic device 1500.

The electronic device 1500 may control the power module (e.g., the power module 280) to power off the electronic device 1500 when the data backup is finished or a predetermined time period has passed after the immersion event, regardless of whether the backup operation is finished.

According to aspects of the present disclosure, when the electronic device 1500 is immersed in water, the control module of the electronic device 1500 (e.g., the control module 200) may store in its memory an indication of the time of immersion of the electronic device.

According to aspects of the present disclosure, the wireless communication module (e.g., the wireless communication module 210) may send a request for displaying information related to the immersion of the electronic device to the wearable electronic device 1510 connected to the electronic device 1500 via wireless communications. Additionally or alternatively, the request may be sent to any other suitable type of electronic device that is designated by the user, such as the electronic device 1520.

According to aspects of the present disclosure, the immersion-related information may include at least one of an immersion warning message, an indication of when the electronic device was immersed in the water, an immersion guide running message, a video or still image captured by the electronic device when the immersion is sensed, or an indication of the location of the electronic device when the electronic device was immersed in the water.

According to aspects of the present disclosure, the control module may backup data designated by the user onto least one of the wearable electronic device 1510, the designated electronic device 1520, and a backup server (e.g., the server 106) that is connected to the electronic device.

According to aspects of the present disclosure, the control module may control the power module to power off the electronic device 1500 when the backup is complete and/or a predetermined time period has passed after detecting that the electronic device is at least partially immersed in water.

Figure 16:
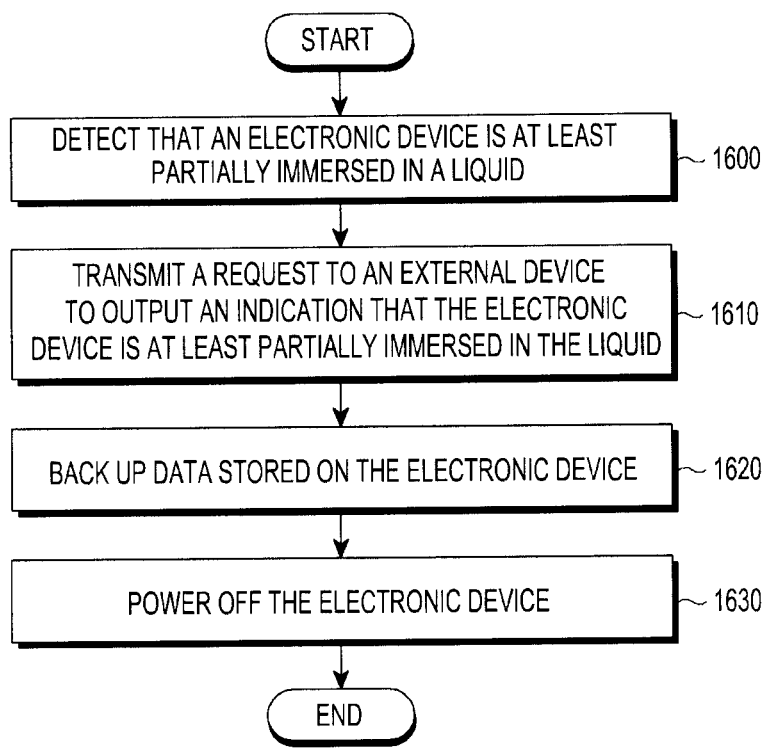
FIG. 16 is a flowchart of an example of a process, according to an embodiment of the present disclosure.

FIG. 16 is a flowchart of an example of a process, according to an embodiment of the present disclosure. According to the process, the electronic device may detect that the electronic device (e.g., the electronic device 1500) is at least partially immersed in a liquid, such as water (1600). Next, in response to detecting that the electronic device 1500 is at least partially immersed in the liquid, the electronic device may send a request to display an immersion notification message to a wearable electronic device (e.g., the wearable electronic device 1510) connected to the first electronic device, or a designated electronic device (e.g., the designated electronic device 1520) designated by the user of the electronic device (1610).

In addition, the electronic device may generate or obtain data related to the immersion (e.g., an indication of the location of the electronic device at the time of immersion, one or more images of the surrounding environment of the electronic device, etc.) and transmit the same to the wearable electronic device or the designated electronic device as part of the request. Next, t the electronic device may store the immersion-related data its own memory and/or on one of the wearable electronic device, the designated electronic device, and a server (e.g., the server 106). Additionally or alternatively, the electronic device 1500 may backup any other data that is designated by the user on at least one of the electronic device, the wearable electronic device, the designated electronic device, and the server (1620). Afterwards, the electronic device may power itself off (1630).

According to an embodiment of the present disclosure, when the electronic device detects that it is at least partially immersed in the liquid, the electronic device may record the current time and treat it as the time of immersion.

According to aspects of the present disclosure, the electronic device may request a wearable electronic device connected to the electronic device via wireless communications or a designated electronic device preset by the electronic device to display information related to the immersion of the electronic device.

According to aspects of the present disclosure, the immersion-related information may include at least one of an immersion warning message, an indication of the time when the immersion was detected, an immersion guide running message, a video or still image captured by the electronic device when the immersion is sensed, or an indication of the location of the electronic device when the immersion is sensed.

According to an embodiment of the present disclosure, when detecting that the electronic device is immersed in the liquid, the electronic device may back up selected data stored in the memory of the electronic device on at least one of the wearable electronic device, the designated electronic device, and a server connected to the electronic device via wireless communications.

According to an embodiment of the present disclosure, the electronic device may power off when the data backup is complete and/or a predetermined time period expires after detecting that the electronic device is at least partially immersed in the liquid.

Figure 17:
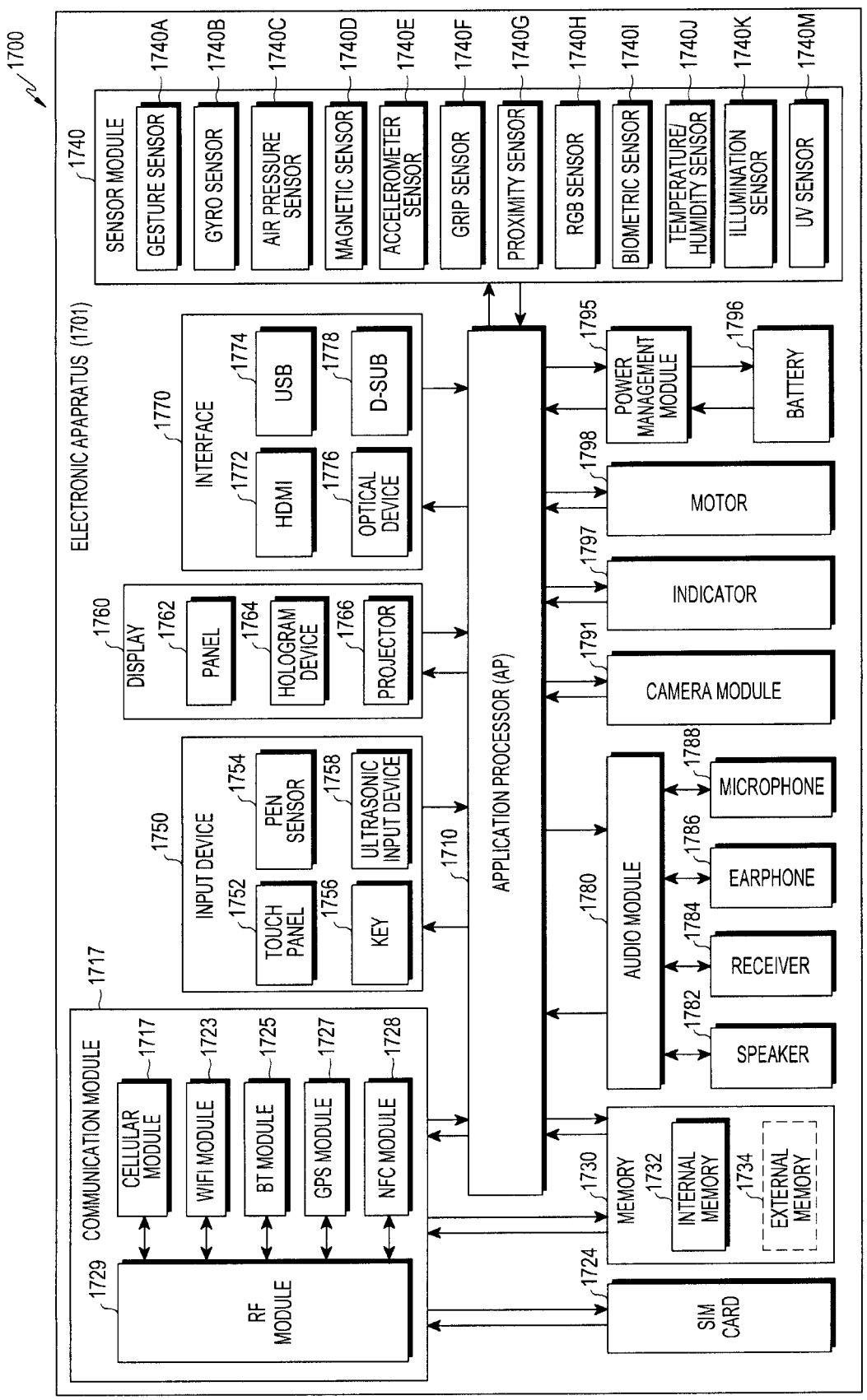
FIG. 17 is a diagram of an example of an electronic device, according to an embodiment of the present disclosure.

FIG. 17 is a diagram of an example of an electronic device, according to an embodiment of the present disclosure.

FIG. 17 is a block diagram 1700 illustrating an electronic device 1701 according to an embodiment of the present disclosure. The electronic device 1701 may include the whole or part of the configuration of, e.g., the electronic device 101 shown in FIG. 1. The electronic device 1701 may include one or more application processors (APs) 1710, a communication module 1720, an SIM (subscriber identification module) card 1724, a memory 1730, a sensor module 1740, an input device 1750, a display 1760, an interface 1770, an audio module 1780, a camera module 1791, a power management module 1795, a battery 1796, an indicator 1797, and a motor 1798.

The AP 1710 may control multiple hardware and software components connected to the AP 1710 by running, e.g., an operating system or application programs, and the AP 1710 may process and compute various data. The AP 1710 may be implemented in, e.g., a system on chip (SoC). According to an embodiment of the present disclosure, the AP 1710 may further include a graphic processing unit (GPU) and/or an image signal processor. The AP 1710 may include at least some (e.g., the cellular module 1721) of the components shown in FIG. 17. The AP 1710 may load a command or data received from at least one of other components (e.g., a non-volatile memory) in volatile memory, process the command or data, and store various data in the non-volatile memory.

The communication module 1720 may have the same or similar configuration to the communication interface 160 of FIG. 1. The communication module 1720 may include, e.g., a cellular module 1721, a wireless fidelity (Wi-Fi) module 1723, a Bluetooth (BT) module 1725, a global positioning system (GPS) module 1727, a near-field communication (NFC) module 1728, and a radio frequency (RF) module 1729.

The cellular module 1721 may provide voice call, video call, text, or Internet services through a communication network (e.g., a long-term evolution (LTE), LTE-advanced (LTE-A), code division multiple access (CDMA), wideband CDMA (WCDMA), universal mobile telecommunications system (UMTS), wireless broadcast (WiBro), or global system for mobile communications (GSM) network).

According to an embodiment of the present disclosure, the cellular module 1721 may perform identification or authentication on the electronic device 1701 in the communication network using a subscriber identification module (e.g., the SIM card 1724). According to an embodiment of the present disclosure, the cellular module 1721 may perform at least some of the functions provided by the AP 1710. According to an embodiment of the present disclosure, the cellular module 1721 may include a communication processor (CP).

The Wi-Fi module 1723, the BT module 1725, the GPS module 1727, or the NFC module 1728 may include a process for, e.g., processing data communicated through the module. At least some (e.g., two or more) of the cellular module 1721, the Wi-Fi module 1723, the BT module 1725, the GPS module 1727, and the NFC module 1728 may be included in a single integrated circuit (IC) or an IC package.

The RF module 1729 may communicate data, e.g., communication signals (e.g., RF signals). The RF module 1729 may include, e.g., a transceiver, a power amplifier module (PAM), a frequency filter, an LNA (low noise amplifier), or an antenna. According to an embodiment of the present disclosure, at least one of the cellular module 1721, the Wi-Fi module 1723, the BT module 1725, the GPS module 1727, or the NFC module 1728 may communicate RF signals through a separate RF module.

The SIM card 1724 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory (e.g., the memory 1730) may include, e.g., an internal memory 1732 or an external memory 1734. The internal memory 1732 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 1734 may include a flash drive, e.g., a compact flash (CF) memory, a secure digital (SD) memory, a micro-SD memory, a min-SD memory, an extreme digital (xD) memory, or a Memory Stick™. The external memory 1734 may be functionally and/or physically connected to the electronic device 1701 via various interfaces.

For example, the sensor module 1740 may measure a physical quantity or detect an operational state of the electronic device 1701, and the sensor module 1740 may convert the measured or detected information into an electrical signal. The sensor module 1740 may include at least one of, e.g., a gesture sensor 1740A, a gyro sensor 1740B, an air pressure sensor 1740C, a magnetic sensor 1740D, an acceleration sensor 1740E, a grip sensor 1740F, a proximity sensor 1740G, a color sensor 1740H such as an red-green-blue (RGB) sensor, a biosensor 1740I, a temperature/humidity sensor 1740J, an illumination sensor 1740K, or an ultraviolet (UV) sensor 1740M. Additionally or alternatively, the sensing module 1740 may include, e.g., an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 1740 may further include a control circuit for controlling at least one or more of the sensors included in the sensing module. According to an embodiment of the present disclosure, the electronic device 1701 may further include a processor configured to control the sensor module 1740 as part of an AP 1710 or separately from the AP 1710, and the electronic device 1701 may control the sensor module 1740 while the AP is in a sleep mode.

The input unit 1750 may include, e.g., a touch panel 1752, a (digital) pen sensor 1754, a key 1756, or an ultrasonic input device 1758. The touch panel 1752 may use at least one of capacitive, resistive, infrared, or ultrasonic methods. The touch panel 1752 may further include a control circuit. The touch panel 1752 may further include a tactile layer and may provide a user with a tactile reaction.

The (digital) pen sensor 1754 may include, e.g., a part of a touch panel or a separate sheet for recognition. The key 1756 may include any suitable type of input device, such as a physical button, an optical key or a keypad. The ultrasonic input device 1758 may use an input tool that generates an ultrasonic signal and enable the electronic device 1701 to identify data by sensing the ultrasonic signal to a microphone (e.g., a microphone 1788).

The display 1760 (e.g., the display 160) may include a panel 1762, a hologram device 1764, or a projector 1766. The panel 1762 may have the same or similar configuration to the display 160 of FIG. 1. The panel 1762 may be implemented to be flexible, transparent, or wearable. The panel 1762 may also be incorporated with the touch panel 1752 in a module. The hologram device 1764 may make three-dimensional (3D) images (holograms) in the air by using light interference. The projector 1766 may display an image by projecting light onto a screen. The screen may be, for example, located inside or outside of the electronic device 1701. In accordance with an embodiment, the display 1760 may further include a control circuit to control the panel 1762, the hologram device 1764, or the projector 1766.

The interface 1770 may include e.g., a high definition multimedia Interface (HDMI) 1772, a USB 1774, an optical interface 1776, or a D-subminiature (D-sub) 1778. The interface 1770 may be part of the communication interface 160 shown in FIG. 1. Additionally or alternatively, the interface 1770 may include a Mobile High-definition Link (MHL) interface, a secure digital (SD) card/multimedia card (MMC) interface or infrared data association (IrDA) standard interface.

The audio module 1780 may convert a sound into an electric signal or vice versa, for example. At least a part of the audio module 1780 may be included in e.g., the electronic device 101 as shown in FIG. 1. The audio module 1780 may process sound information input or output via one or more of a speaker 1782, a receiver 1784, an earphone 1786, or a microphone 1788.

For example, the camera module 1791 may be a device for capturing still images and videos, and may include, according to an embodiment of the present disclosure, one or more image sensors (e.g., front and back sensors), a lens, an Image Signal Processor (ISP), or a flash such as a light emitting diode (LED) or xenon lamp.

The power manager module 1795 may manage the power supply of the electronic device 1701, for example. Although not shown, according to an embodiment of the present disclosure, a power management integrated circuit (PMIC), a charger IC, or a battery or fuel gauge is included in the power manager module 1795. The PMIC may have a wired and/or wireless recharging scheme. The wireless charging scheme may include any suitable type of wireless charging scheme, such as a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 1796, a voltage, a current, or a temperature while the battery 1796 is being charged. The battery 1796 may include, e.g., a rechargeable battery or a solar battery.

The indicator 1797 may indicate a particular state of the electronic device 1701 or a part of the electronic device (e.g., the AP 1710), including e.g., a booting state, a message state, or recharging state. The motor 1798 may convert an electric signal to a mechanical vibration and may generate a vibrational or haptic effect. Although not shown, a processing unit for supporting mobile TV, such as a graphics processing unit (GPU) may be included in the electronic device 1701. The processing unit for supporting mobile TV may process media data conforming to a standard for Digital Multimedia Broadcasting (DMB), Digital Video Broadcasting (DVB), or MediaFLO™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 18:
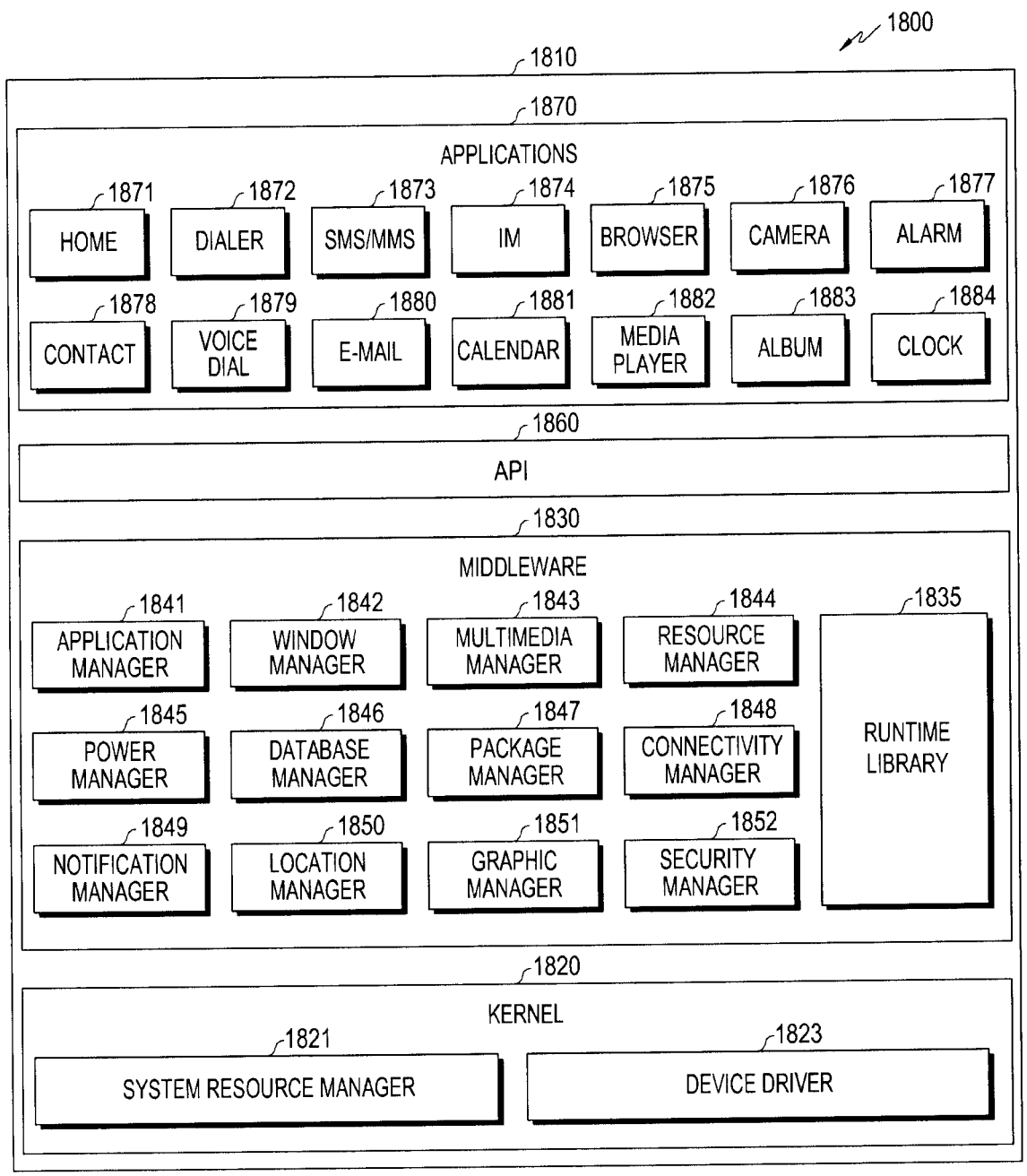
FIG. 18 is a diagram of an example of a program module, according to an embodiment of the present disclosure.

FIG. 18 is a diagram of an example of a program module, according to an embodiment of the present disclosure.

FIG. 18 is a block diagram 1800 illustrating a program module 1810 according to an embodiment of the present disclosure. According to an embodiment of the present disclosure, the program module 1810 (e.g., the program 140) may include an operating system (OS) controlling resources related to the electronic device (e.g., the electronic device 101) and/or various applications (e.g., the application processor 147) executed on the operating system. The operating system may include, e.g., Android, iOS, Windows, Symbian, Tizen, or Bada.

The program 1810 may include, e.g., a kernel 1820, middleware 1830, an application programming interface (API) 1860, and/or an application 1870. At least a part of the program module 1810 may be preloaded on the electronic device or may be downloaded from a server (e.g., the server 106).

The kernel 1820 (e.g., the kernel 141 of FIG. 1) may include, e.g., a system resource manager 1821 or a device driver 1823. The system resource manager 1821 may perform control, allocation, or recovery of system resources. According to an embodiment of the present disclosure, the system resource manager 1821 may include a process managing unit, a memory managing unit, or a file system managing unit. The device driver 1823 may include, e.g., a display driver, a camera driver, a Bluetooth driver, a shared memory driver, a USB driver, a keypad driver, a Wi-Fi driver, an audio driver, or an inter-process communication (IPC) driver.

The middleware 1830 may provide various functions to the application 1870 through the API 1860 so that the application 1870 may efficiently use limited system resources in the electronic device or provide functions jointly required by applications 1870. According to an embodiment of the present disclosure, the middleware 1830 (e.g., middleware 1418) may include at least one of a runtime library 1835, an application manager 1841, a window manager 1842, a multimedia manager 1843, a resource manager 1844, a power manager 1845, a database manager 1846, a package manager 1847, a connectivity manager 1848, a notification manager 1849, a location manager 1850, a graphic manager 1851, or a security manager 1852.

The runtime library 1835 may include a library module used by a compiler in order to add a new function via a programming language while, e.g., the application 1870 is being executed. The runtime library 1835 may perform input/output management, memory management, or arithmetic functions.

The application manager 1841 may manage the life cycle of at least one application of, e.g., the applications 1870. The window manager 1842 may manage GUI resources used on the screen. The multimedia manager 1843 may grasp formats necessary to play various media files and use a codec appropriate for a format to perform encoding or decoding on media files. The resource manager 1844 may manage resources, such as source code of at least one of the applications 1870, memory or storage space.

The power manager 1845 may operate together with, e.g., a basic input/output system (BIOS) to manage battery or power and provide power information necessary for operating the electronic device. The database manager 1846 may generate, search, or vary a database to be used in at least one of the applications 1870. The package manager 1847 may manage installation or update of an application that is distributed in the form of a package file.

The connectivity manager 1848 may manage wireless connectivity, such as, Wi-Fi or Bluetooth. The notification manager 1849 may display or notify an event, such as a coming message, appointment, or proximity notification, of the user without interfering with the user. The location manager 1850 may manage locational information on the electronic device. The graphic manager 1851 may manage graphic effects to be offered to the user and their related user interface. The security manager 1852 may provide various security functions necessary for system security or user authentication. According to an embodiment of the present disclosure, when the electronic device (e.g., the electronic device 101) has telephony capability, the middleware 1830 may further include a telephony manager for managing voice call or video call functions of the electronic device.

The middleware 1830 may include a middleware module forming a combination of various functions of the above-described components. The middleware 1830 may provide a specified module per type of the operating system in order to provide a differentiated function. Further, the middleware 1830 may dynamically omit some existing components or add new components.

The API 1860 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 1870 (e.g., the application processor 147) may include one or more applications that may provide functions such as, e.g., a home 1871, a dialer 1872, a short message service (SMS)/multimedia messaging service (MMS) 1873, an instant message (IM) 1874, a browser 1875, a camera 1876, an alarm 1877, a contact 1878, a voice dial 1879, an email 1880, a calendar 1881, a media player 1882, an album 1883, or a clock 1884, a health-care (e.g., measuring the degree of workout or blood sugar), or provision of environmental information (e.g., provision of air pressure, moisture, or temperature information).

According to an embodiment of the present disclosure, the application 1870 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, healthcare application, or environmental information application) to the external electronic device (e.g., the electronic devices 102 and 104). Further, the notification relay application may receive notification information from, e.g., the external electronic device and may provide the received notification information to the user. The device management application may perform at least some functions of the external electronic device (e.g., the electronic device 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided by the external electronic device.

According to an embodiment of the present disclosure, the application 1870 may include an application (e.g., a health-care application) designated depending on the attribute (e.g., as an attribute of the electronic device, the type of electronic device is a mobile medical device) of the external electronic device (e.g., the electronic devices 102 and 104). According to an embodiment of the present disclosure, the application 1870 may include an application received from the external electronic device (e.g., the server 106 or electronic devices 102 and 104). According to an embodiment of the present disclosure, the application 1870 may include a preloaded application or a third party application downloadable from a server. The names of the components of the program module 1810 according to the shown embodiment may be varied depending on the type of operating system.

According to an embodiment of the present disclosure, at least a part of the program module 1810 may be implemented in software, firmware, hardware, or in a combination of two or more thereof. At least a part of the programming module 1810 may be implemented (e.g., executed) by using a processor (e.g., the AP 210). At least a part of the program module 1810 may include a module, program, routine, set of instructions, process, or the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be the memory 130 for example.

The computer-readable storage medium may include a hardware device, such as hard discs, floppy discs, and magnetic tapes (e.g., a magnetic tape), optical media such as compact disc read-only memories (ROMs) (CD-ROMs) and digital versatile discs (DVDs), magneto-optical media such as floptical disks, ROMs, random access memories (RAMs), flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

According to aspects of the present disclosure, there are provided an electronic device and method for operating the same that may alert the user to the electronic device dropping underwater.

According to aspects of the present disclosure, there are provided an electronic device and method for operating the same that may determine whether the electronic device is underwater.

According to aspects of the present disclosure, there are provided an electronic device and method for operating the same that may control the electronic device underwater.

The effects set forth herein are not limited thereto, and it is apparent to one of ordinary skill in the art that various effects may be disclosed herein.

FIGS. 1-18 are provided as an example only. At least some of the operations discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device, comprising:
a touchscreen display, and
a processor, wherein the processor is configured to control to:
display, on the touchscreen display, a home screen including a plurality of icons which are corresponding to at least one application respectively,
receive, a first user input for selecting an icon among the plurality of icons, wherein the first user input includes a touch input for the icon,
display, on the touchscreen display, a first execution screen of a first application corresponding to the selected icon,
receive, via the touchscreen display, a second user input for executing a second application, wherein the first user input and the second user input are made by ways different from each other, and wherein the second user input includes an input for presenting a specified shape, and
in response to identifying that the specified shape included in the second user input is corresponding to a predetermined shape for executing the second application, display, on the touchscreen display, a second execution screen of the second application,
wherein the second user input is associated with the second application in an underwater mode of the electronic device when the electronic device is immersed in a liquid, whereby when the underwater mode is not executed, the second execution screen of the second application is not displayed in response to identifying that the specified shape included in the second user input corresponds to the predetermined shape.

2. The electronic device of claim 1, wherein both the first user input and the second user input are made by a hand of a user.

3. The electronic device of claim 1, wherein the specified shape includes a shape of alphabet C.

4. The electronic device of claim 1, wherein the second application includes a camera application or a gallery application.

5. An electronic device, comprising:
a touchscreen display, and
a processor, wherein the processor is configured to control to:
  display, on the touchscreen display, a home screen including a plurality of icons which are corresponding to at least one application respectively,
  in response to receiving, on the home screen, a first user input for selecting an icon among the plurality of icons, the first user input including a touch input on the icon, display, on the touchscreen display, a first execution screen of a first application corresponding to the selected icon,
  in response to receiving, on the home screen, a second user input for executing a second application while the home screen is displayed on the touchscreen display, the second user input including an input for presenting a specified shape, display, on the touchscreen display, a second execution screen of the second application corresponding to the specified shape identified based on the second user input,
wherein the first user input and the second user input being made by ways different from each other, and
wherein the second user input is associated with the second application in an underwater mode of the electronic device when the electronic device is immersed in a liquid, whereby when the underwater mode is not executed, the second execution screen of the second application is not displayed in response to receiving the second user input.

6. The electronic device of claim 5, wherein both the first user input and the second user input are made by a hand of a user.

7. The electronic device of claim 5, wherein the specified shape includes a shape of alphabet C.

8. The electronic device of claim 5, wherein the second application includes a camera application or a gallery application.

9. An electronic device, comprising:
a touchscreen display, and
a processor, wherein the processor is configured to control to:
  display, on the touchscreen display, a home screen including a plurality of icons which are corresponding to at least one application respectively,
  receive a user input while the home screen is displayed,
  in response to identifying that the user input has a first type, provide a screen associated with a processed result of the user input having the first type on the touchscreen display, and
  in response to identifying that the user input has a second type, display, on the touchscreen display, an execution screen of an application corresponding to a specified shape identified by the user input,
wherein the user input of the second type is associated with the application in an underwater mode of the electronic device when the electronic device is immersed in a liquid, whereby when the underwater mode is not executed, the execution screen of the application is not displayed in response to identifying that the user input has the second type.

10. The electronic device of claim 9, wherein the user input is made by a hand of a user.

11. The electronic device of claim 9, wherein the specified shape includes a shape of alphabet C.

12. The electronic device of claim 9, wherein the application corresponding to the specified shape identified by the user input includes a camera application or a gallery application.

13. The electronic device of claim 1, wherein the specified shape includes a single predetermined alphabet.

14. The electronic device of claim 9, wherein the specified shape includes a single predetermined alphabet.

* * * * *